(12) United States Patent
Shinomoto et al.

(10) Patent No.: US 9,825,488 B2
(45) Date of Patent: Nov. 21, 2017

(54) POWER SUPPLY SWITCHING DEVICE AND SWITCH BOARD

(71) Applicants: Yosuke Shinomoto, Tokyo (JP); Kazunori Hatakeyama, Tokyo (JP); Takashi Yamakawa, Tokyo (JP); Makoto Kasugai, Tokyo (JP); Naohide Tsuchimoto, Tokyo (JP)

(72) Inventors: Yosuke Shinomoto, Tokyo (JP); Kazunori Hatakeyama, Tokyo (JP); Takashi Yamakawa, Tokyo (JP); Makoto Kasugai, Tokyo (JP); Naohide Tsuchimoto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 464 days.

(21) Appl. No.: 14/370,662

(22) PCT Filed: Jan. 25, 2013

(86) PCT No.: PCT/JP2013/051595
§ 371 (c)(1),
(2) Date: Jul. 3, 2014

(87) PCT Pub. No.: WO2013/111858
PCT Pub. Date: Aug. 1, 2013

(65) Prior Publication Data
US 2014/0339900 A1    Nov. 20, 2014

(30) Foreign Application Priority Data

Jan. 27, 2012  (JP) .................................. 2012-015680
Jul. 26, 2012  (JP) .................................. 2012-166274

(51) Int. Cl.
*H02J 7/00*    (2006.01)
*H02J 9/00*    (2006.01)
(Continued)

(52) U.S. Cl.
CPC ............. *H02J 9/061* (2013.01); *H02H 3/066* (2013.01); *H02J 3/383* (2013.01); *H02J 7/0063* (2013.01);
(Continued)

(58) Field of Classification Search
CPC .. H02J 9/061; H02J 7/0068; H02J 9/06; H02J 9/062; H02J 7/35; H02J 7/007;
(Continued)

(56) References Cited

U.S. PATENT DOCUMENTS 5,574,653 A * 11/1996 Coomer .............. H02J 13/0086
                                                          361/115
5,878,584 A *  3/1999 Sasaki ................... F24F 5/0046
                                                          307/22
(Continued)

FOREIGN PATENT DOCUMENTS

CN    102005813 A    4/2011
EP    0748991 A2    12/1996
(Continued)

OTHER PUBLICATIONS

Office Action dated Dec. 16, 2015 in the corresponding CN application No. 201380006632.2 (with partial English translation).
(Continued)

*Primary Examiner* — Jared Fureman
*Assistant Examiner* — Esayas Yeshaw
(74) *Attorney, Agent, or Firm* — Posz Law Group, PLC

(57) ABSTRACT

A power supply switching device and switch board checks whether or not a primary-side voltage of a remote shutoff breaker and a secondary-side voltage thereof become a rated voltage after a commercial power system is recovered from a blackout. Next, when both primary-side voltage and secondary-side voltage become the rated voltage, a contactor is actuated to interconnect a home power system with the (Continued)

commercial power system. Hence, charging of the home power system without causing a user to notice such a charging upon recovery of the commercial power system from a blackout can be prevented. As a result, the safety for the user can be ensured.

16 Claims, 17 Drawing Sheets

(51) Int. Cl.
    *H02J 9/06*     (2006.01)
    *H02H 3/06*     (2006.01)
    *H02J 3/38*     (2006.01)

(52) U.S. Cl.
    CPC .............. *H02J 9/062* (2013.01); *Y02B 10/14* (2013.01); *Y02B 10/72* (2013.01); *Y02E 10/563* (2013.01); *Y02E 10/566* (2013.01); *Y10T 307/625* (2015.04)

(58) Field of Classification Search
    CPC ...... H02J 3/383; H02J 9/00; H02J 3/32; H02J 7/0077; H02J 7/34; H02J 1/10; H02J 9/04; H02J 1/00; H02J 2009/063
    See application file for complete search history.

(56) References Cited

U.S. PATENT DOCUMENTS

| | | | | |
|---|---|---|---|---|
| 6,282,104 | B1* | 8/2001 | Kern | H02M 1/12 363/34 |
| 2007/0177338 | A1 | 8/2007 | Nishi et al. | |
| 2007/0183444 | A1* | 8/2007 | Schoettle | H02J 1/14 370/449 |
| 2008/0203820 | A1 | 8/2008 | Kramer et al. | |
| 2009/0027932 | A1* | 1/2009 | Haines | H02J 9/062 363/95 |
| 2010/0145542 | A1* | 6/2010 | Chapel | G05B 15/02 700/295 |
| 2011/0051325 | A1 | 3/2011 | Kawasaki | |
| 2011/0148360 | A1 | 6/2011 | Lee | |
| 2011/0227418 | A1* | 9/2011 | Pyboyina | H02J 9/062 307/75 |
| 2012/0013347 | A1* | 1/2012 | Holsomback | G01R 31/016 324/548 |
| 2012/0144909 | A1* | 6/2012 | Dreyer | H02P 9/00 73/118.01 |
| 2012/0299386 | A1* | 11/2012 | Kaufman | H02J 1/12 307/82 |
| 2013/0285670 | A1* | 10/2013 | Yoshidomi | G01R 31/025 324/510 |
| 2014/0163762 | A1* | 6/2014 | Nakamura | H02J 3/32 700/295 |
| 2014/0339900 | A1* | 11/2014 | Shinomoto | H02H 3/066 307/66 |

FOREIGN PATENT DOCUMENTS

| | | |
|---|---|---|
| EP | 1965483 A1 | 9/2008 |
| GB | 2394130 A | 4/2004 |
| JP | 07-336896 A | 12/1995 |
| JP | H07-336896 A | 12/1995 |
| JP | H08-065899 A | 3/1996 |
| JP | H10-051959 A | 2/1998 |
| JP | 2002-252928 A | 9/2002 |
| JP | 2003-087978 A | 3/2003 |
| JP | 2004-129461 A | 4/2004 |
| JP | 2004-199881 A | 7/2004 |
| JP | 2004-242458 A | 8/2004 |
| JP | 2005-278297 A | 10/2005 |
| JP | 2007-209133 A | 8/2007 |
| JP | 2008-206266 A | 9/2008 |
| JP | 2010-093878 A | 4/2010 |
| JP | 2011-050131 A | 3/2011 |
| JP | 2013-176278 A | 9/2013 |
| KR | 10-2010-0125809 A | 12/2010 |
| KR | 10-2011-0072911 A | 6/2011 |
| WO | 2008/138016 A1 | 11/2008 |

OTHER PUBLICATIONS

Office Action dated Jan. 8, 2016 in the corresponding KR application No. 10-2014-7020809 (with partial English translation).
International Search Report of the International Searching Authority dated Apr. 16, 2013 for the corresponding international application No. PCT/JP2013/051595 (and English translation).
Office Action dated Jul. 7, 2016 issued in corresponding KR patent application No. 10-2014-7020809 (and partial English translation).
Office Action dated Jul. 14, 2016 issued in corresponding CN patent application No. 201380006632.2 (and partial English translation).
Office Action dated Dec. 9, 2014 issued in corresponding JP patent application No. 2014-043257 (and English translation).
Extended European Search Report dated Mar. 18, 2016 in the corresponding EP application No. 13740689.8.
Office Action dated Nov. 4, 2016 issued in corresponding KR patent application No. 10-2016-7025979 (and partial English translation).
Office Action dated Aug. 17, 2017 issued in corresponding EP patent application No. 13740689.8.

\* cited by examiner

POWER SUPPLY SWITCHING DEVICE AND SWITCH BOARD

CROSS REFERENCE TO RELATED APPLICATIONS

This application is a U.S. national stage application of International Patent Application No. PCT/JP2013/051595 filed on Jan. 25, 2013, and is based on Japanese Patent Application No. 2012-166274 filed on Jul. 26, 2012, and Japanese Patent Application No. 2012-15680 filed on Jan. 27, 2012, the disclosures of which are incorporated herein by reference.

TECHNICAL FIELD

The present disclosure relates to a power supply switching device and a switch board, and more specifically, a power supply switching device that switches two power supplies in accordance with a situation, and a switch board including the power supply switching device.

BACKGROUND

In accordance with global warming and the development of economics and industries advancing on a worldwide scale, efforts to reduce energy consumption is becoming important. Based on such a background, distributed-type power supply systems represented by a solar power generation system are becoming popular (see, for example, Patent Literatures 1 and 2). In addition, as an emergency power supply at the time of disaster, interests in such distributed-type power supply systems are nowadays increasing.

As to a distributed-type power supply system installed in a standard home, it is prohibited to provide generated and stored power to a commercial power system except from solar power generation systems. Hence, in order to make a distributed-type power supply available at the time of, for example, blackout, it is desirable to separate a power system at home (home power system) from a commercial power system.

According to distributed-type power supply systems, however, it is difficult to keep supplying power to all electric apparatuses installed at home. Therefore, when a commercial power system is recovered, it is necessary to quickly interconnect the home power system with the commercial power system.

PATENT LITERATURE

Patent Literature 1: Unexamined Japanese Patent Application Kokai Publication No. 2004-242458
Patent Literature 2: Unexamined Japanese Patent Application Kokai Publication No. 2007-209133

Technical Problem

Parallel-off and interconnection of a home power system relative to a commercial power system have no leeway for a failure due to the public nature of the commercial power system. However, most users of the distributed-type power systems installed at home hardly have a technical knowledge about electricity. Therefore, it is necessary to suppress an incorrect operation by a user in order to interconnect the home power system once subjected to parallel-off with the commercial power system again.

SUMMARY

The present disclosure has been made under the aforementioned circumstances, and it is an objective of the present disclosure to safely interconnect a home power system including a distributed-type power supply system with a commercial power system.

To accomplish the above objective, a power supply switching device according to the present disclosure includes: first parallel-off means that parallels off a power storage and a load from a power system; a first voltage detector which is disposed at a primary side of the first parallel-off means and which detects a voltage of the power system; and a controller which actuates the first parallel-off means to interconnect the power storage and the load with the power system based on an instruction given by a user when the first parallel-off means is performing parallel-off from the power system on the power storage and the load and the first voltage detector detects a voltage.

The device of the present disclosure includes the controller that performs interconnection and parallel-off of the power storage and the load relative to the power system based on an instruction given by a user. This controller performs power system interconnection based on the user's intent when the power system has recovered after a blackout. Therefore, a power system interconnection despite the user's intent becomes avoidable, resulting in a safe power system interconnection.

DETAILED DESCRIPTION

First Embodiment

A first embodiment of the present disclosure will be explained with reference to the accompanying drawings.

Figure 1:
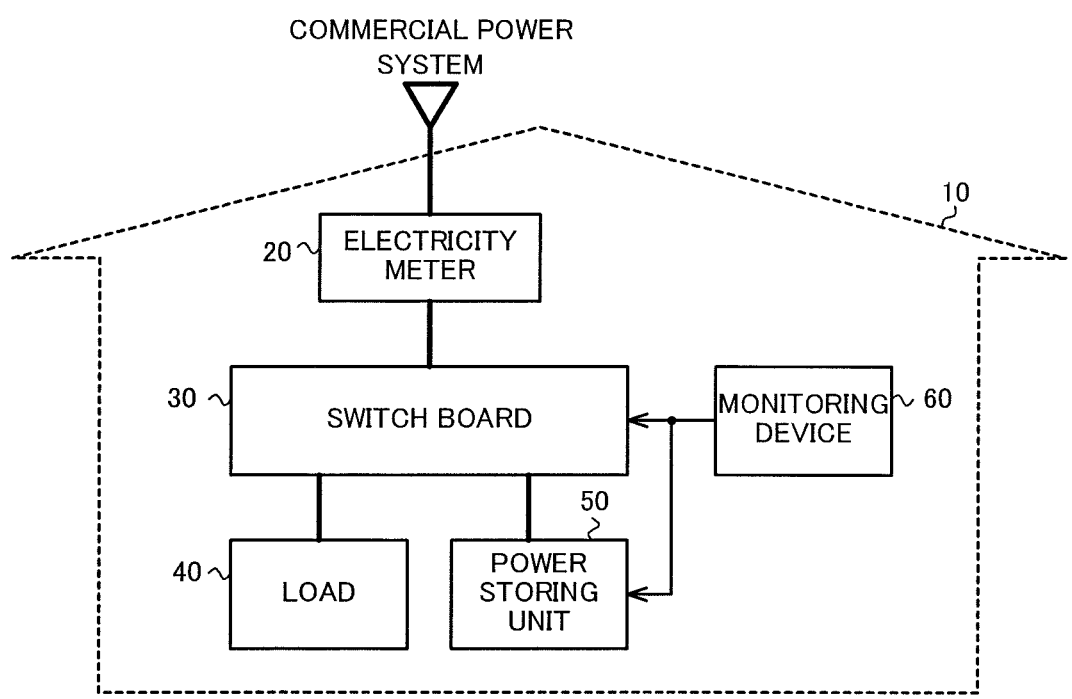
FIG. 1 is a block diagram illustrating a switch board, a load, and the like according to a first embodiment.

FIG. 1 is a block diagram illustrating a switch board 30 according to this embodiment, a load 40 connected to a single-phase three-line commercial power system through the switch board 30, or the like.

The load 40 is, for example, an electric apparatus utilized in a house 10, and is home electronics including, for example, an air-conditioner, a refrigerator, a microwave oven, a washing machine, a television apparatus, a personal computer, or the like. Each load 40 is connected to the switch board 30.

Figure 2:
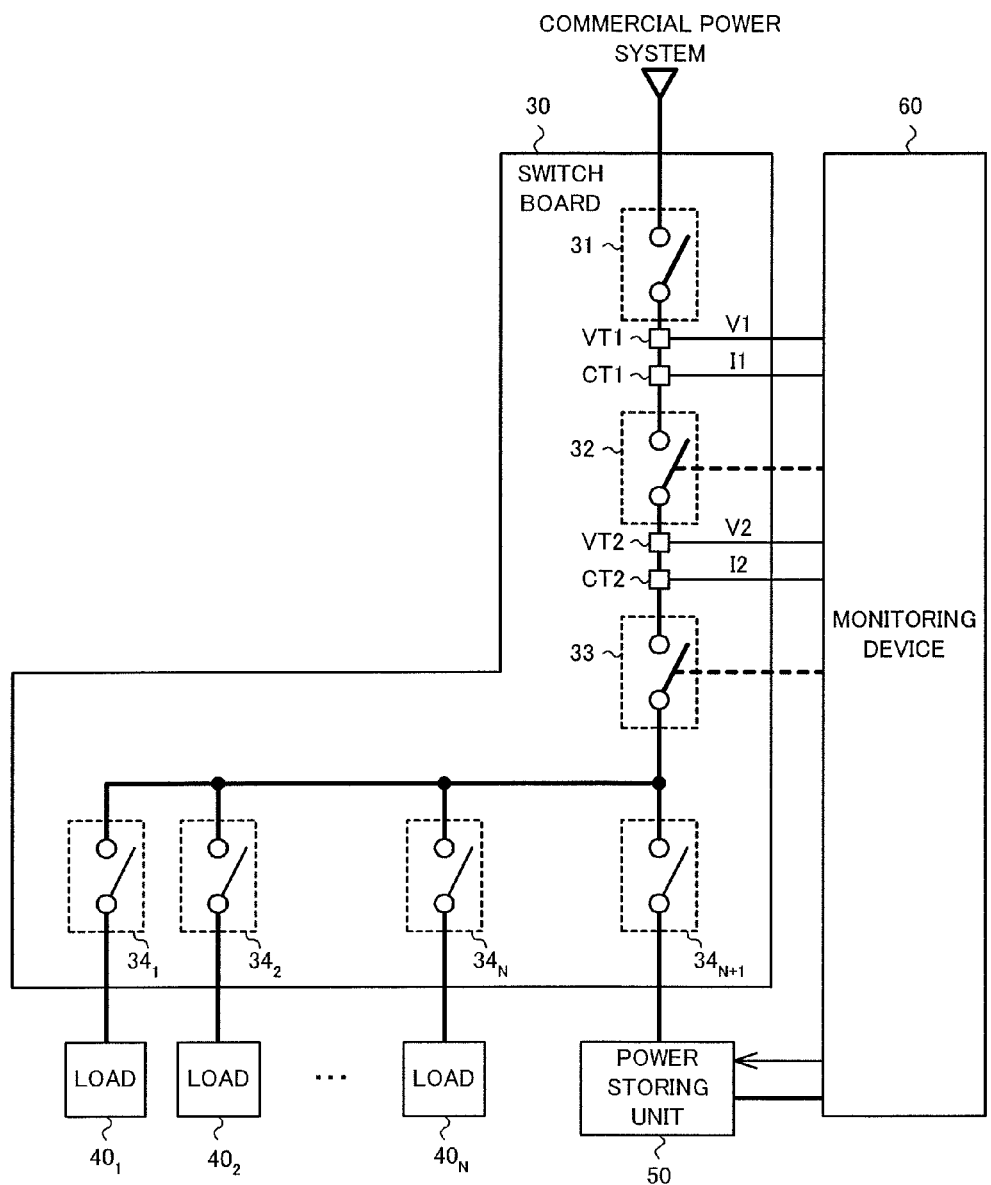
FIG. 2 is a block diagram illustrating a switch board.

FIG. 2 is a block diagram of the switch board 30. As illustrated in FIG. 2, the switch board 30 includes a master breaker 31, a remote shutoff breaker 32, a contactor 33, and multiple branched breakers 34.

The master breaker 31 is a breaker that distinguishes a power system by an electricity company (hereinafter, referred to as a commercial power system), and a power system of the house 10 (hereinafter, referred to as a home power system). This master breaker 31 parallels off the home power system interconnected with the commercial power system from the commercial power system when, for example, an overcurrent flows from the commercial power system to the home power system. As illustrated in FIG. 1, the commercial power system is drawn into the switch board 30 through an electricity meter 20, and is connected to the primary side of the master breaker 31.

The remote shutoff breaker 32 is provided at the secondary side of the master breaker 31. This remote shutoff breaker 32 is operated based on a shutoff instruction from a monitoring device 60, and interconnects or parallels off the home power system relative to the commercial power system as the master breaker 31 also does.

Provided at the primary side of the remote shutoff breaker 32 are a voltage detecting transformer VT1, and a set of current transformers CT1. In addition, provided at the secondary side of the remote shutoff breaker 32 are a voltage detecting transformer VT2 and a set of current transformers CT2.

Figure 3:
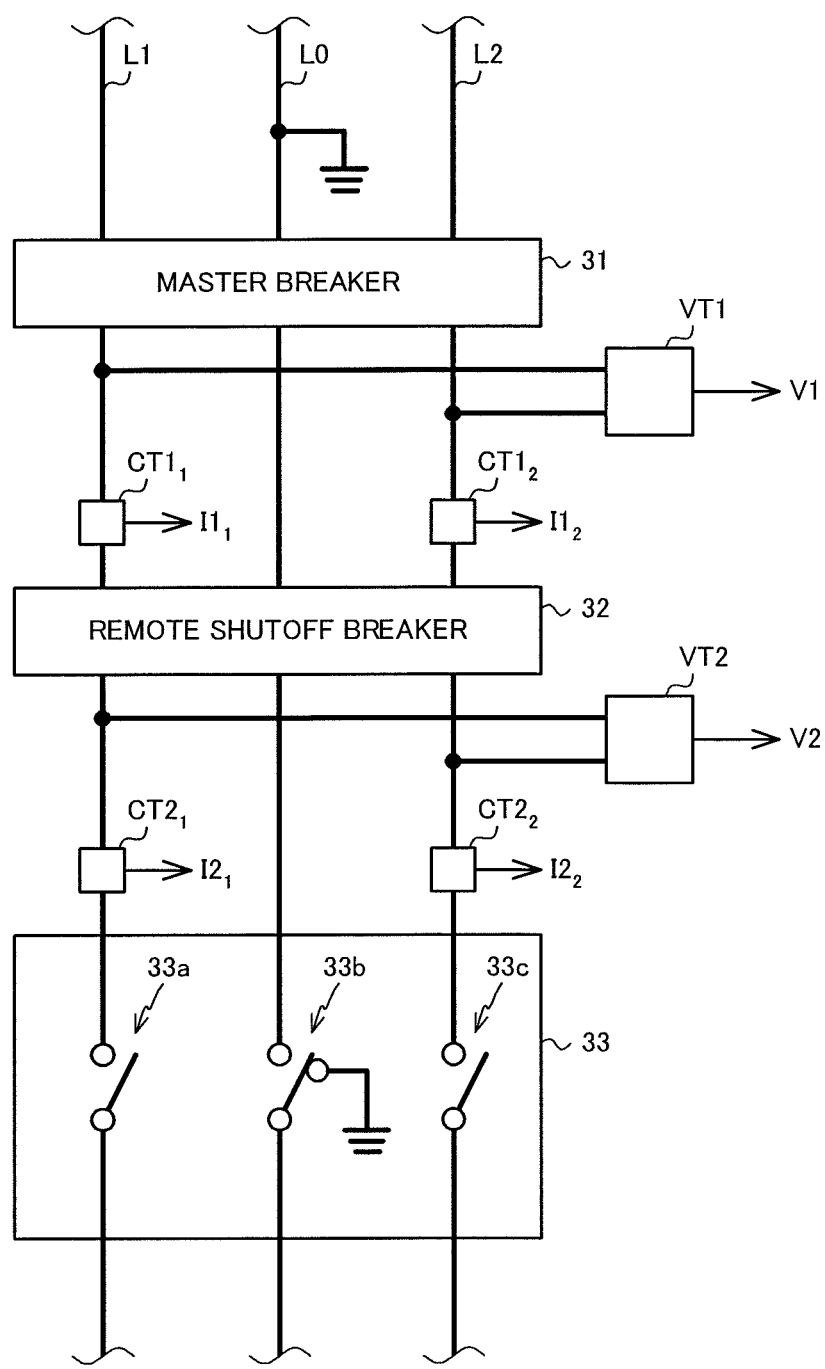
FIG. 3 is a diagram illustrating a home power system at the secondary side of a master breaker.

FIG. 3 is a diagram illustrating the home power system at the secondary side of the master breaker 31. As illustrated in FIG. 3, the home power system includes a neutral line L0 and power supply lines L1, L2, and the neutral line L0 is grounded. In addition, the voltage detecting transformers VT1, VT2 are connected to the power supply lines L1, L2. A voltage proportional to a voltage across the power supply lines L1, L2 appears at the secondary sides of the voltage detecting transformers VT1, VT2.

In addition, a set of current transformers $CT1_1$, $CT1_2$ is provided at the power supply lines L1, L2, respectively, and the secondary currents of the current transformers $CT1_1$, $CT1_2$ reach a current value proportional to the current flowing through the power supply lines L1, L2.

The contactor 33 is provided at the secondary side of the remote shutoff breaker 32. This contactor 33 is electromagnetically actuated based on an open/close instruction from the monitoring device 60, interconnects the commercial power system with the home power system, or parallels off those from each other.

As illustrated in FIG. 3, the contactor 33 includes a contact 33*a* provided at the power supply line L1, a contact 33*b* provided at the neutral line L0, and a contact 33*c* provided at the power supply line L2. The respective contacts 33*a* to 33*c* are actuated in synchronization with the open/close instruction from the monitoring device 60, and the home power system is subjected to parallel-off from the commercial power system when the contacts 33*a* to 33*c* are opened, and the home power system is interconnected with the commercial power system when the contacts 33*a* to 33*c* are closed. According to this contactor 33, when the contact 33*b* is opened, and the neutral line L0 is opened, the neutral line L0 at the secondary side of the contactor 33 is grounded.

As illustrated in FIG. 2, the branched breakers 34 are provided at the secondary side of the contactor 33 in parallel with each other. Each of those branched breakers 34 is provided for each load 40 and each power storing unit 50. When the branched breaker 34 is opened/closed, the load 40 and the power storing unit 50 can be disconnected from the power system.

The above-explained master breaker 31, remote shutoff breaker 32, contactor 33, and branched breakers 34 are each retained in a casing made of metal or plastic.

Figure 4:
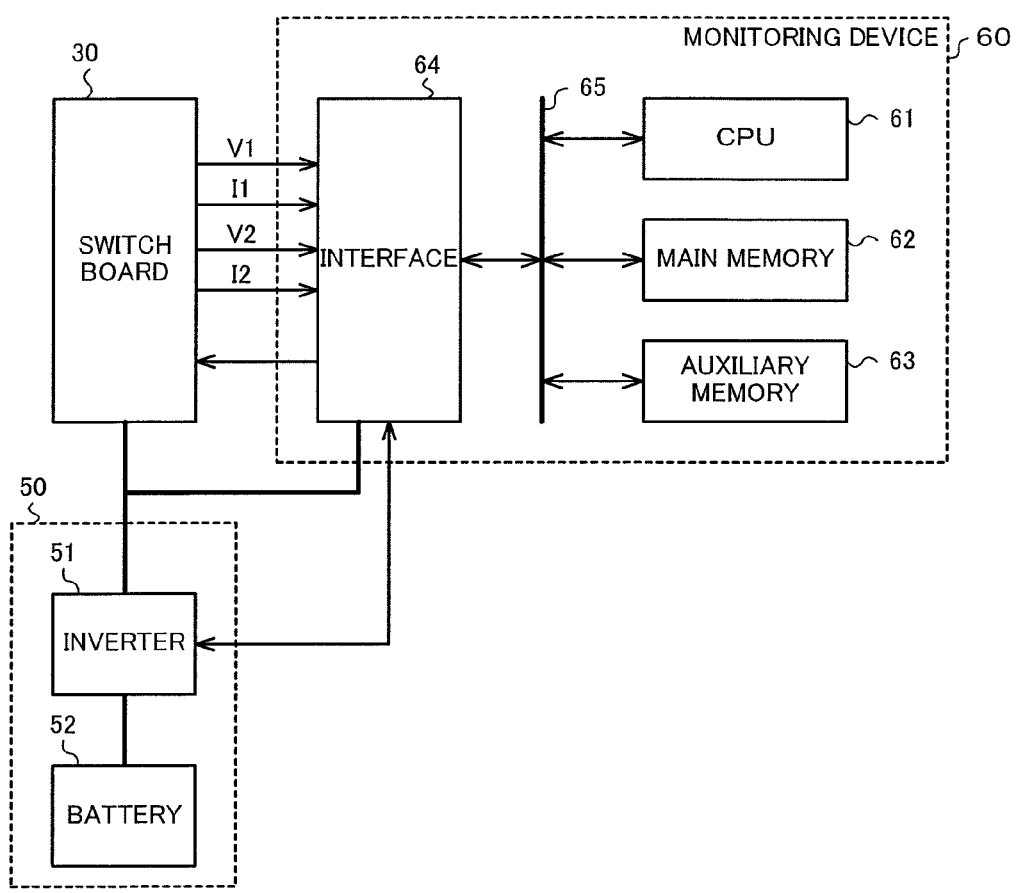
FIG. 4 is a block diagram illustrating a monitoring device and a power storing unit.

FIG. 4 is a block diagram illustrating the monitoring device 60 and the power storing unit 50. The power storing unit 50 is to store power supplied from the commercial power system. As illustrated in FIG. 4, this power storing unit 50 includes an inverter 51 and a battery 52.

The battery 52 is a battery including multiple cells filled with an electrolytic solution. AC voltage from the commercial power system is converted into DC voltage by the inverter 51, and is applied to the battery 52. Hence, the battery 52 stores an electrical charge. In addition, at the time of a blackout of the commercial power system, the DC voltage of the battery 52 is converted into AC voltage by the inverter 51, and is applied to the home power system. Hence, power is supplied to the home power system from the power storing unit 50. Still further, at the time of a blackout of the commercial power system, the power storing unit 50 also supplies power to the monitoring device 60.

AC-DC conversion and DC-AC conversion by the inverter 51 are performed based on an instruction from the monitoring device 60. This makes it possible for the power storing unit 50 to be interconnected with the commercial power system in synchronization therewith.

As illustrated in FIG. 4, the monitoring device 60 includes a CPU (Central Processing Unit) 61, a main memory 62, an auxiliary memory 63, an interface 64, and a system bus 65 interconnecting those blocks together.

The CPU 61 executes predetermined processes to be discussed later in accordance with a program stored in the auxiliary memory 63.

The main memory 62 includes, for example, a RAM (Random Access Memory). This main memory 62 is utilized as a work area for the CPU 61.

The auxiliary memory 63 includes a non-volatile memory, such as a ROM (Read Only Memory), a magnetic disk, or a semiconductor memory. This auxiliary memory 63 stores the program, parameters, or the like to execute the processes to be discussed later.

The interface 64 includes a serial interface or an analog interface to receive analog signals. As is clear from FIG. 2, the interface 64 is connected with the secondary-side terminals of the voltage detecting transformers VT1, VT2, and the secondary-side terminals of the current transformers CT1, CT2 through cables. In addition, the interface 64 is connected with the inverter 51 of the power storing unit 50, the remote shutoff breaker 32, and the contactor 33.

The CPU 61 measures, through the interface 64, the secondary-side voltages of the voltage detecting transformers VT1, VT2, and the secondary-side currents of the current transformers CT1, CT2, thereby indirectly measuring a primary-side voltage V1 of the remote shutoff breaker 32 and a secondary-side voltage V2 thereof, and, a primary-side current I1 of the remote shutoff breaker 32 and a secondary-side current I2 thereof.

Next, the CPU 61 is capable of calculating power flow from the commercial power system to the home power system, and reverse power flow from the home power system to the commercial power system based on the primary-side voltage V1, the secondary-side voltage V2, the primary-side current I1, and the secondary-side current I2. When reverse power flow to the commercial power system occurs, the CPU 61 controls the output by the inverter 51 of the power storing unit 50 to limit reverse power flow.

The CPU 61 outputs a power storing instruction to the inverter 51 to store power in the battery 52. In addition, the CPU 61 outputs a discharging instruction to supply power stored in the battery 52 to the home power system.

The CPU 61 outputs a shutoff instruction to the remote shutoff breaker 32 to actuate the remote shutoff breaker 32 and to parallel off the home power system from the commercial power system. In addition, the CPU 61 outputs a shutoff instruction to the contactor 33 to parallel off the home power system from the commercial power system. Next, when a turn-on instruction is output to the contactor 33, the home power system is interconnected with the commercial power system.

Figure 5:
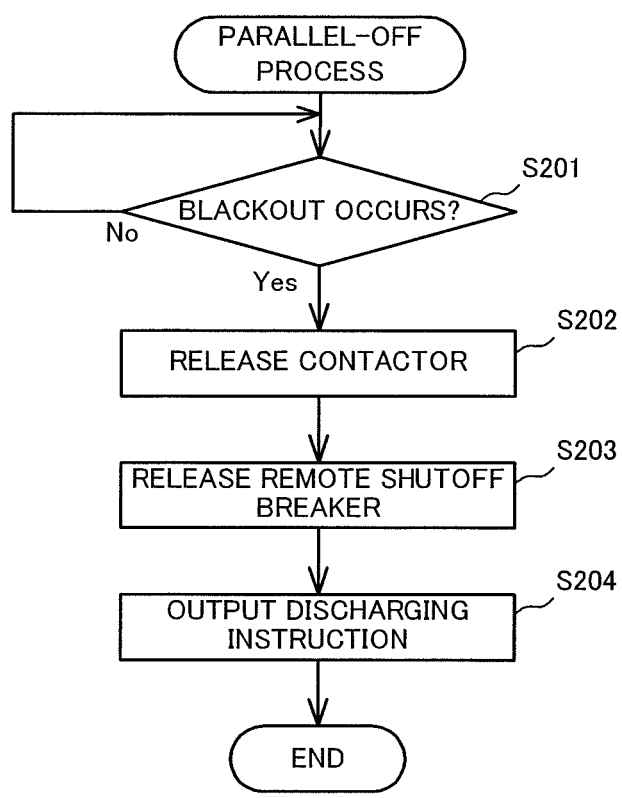
FIG. 5 is a flowchart illustrating a parallel-off process.

Next, an explanation will be given of a parallel-off process by the monitoring device 60 employing the above-explained structure. FIG. 5 is a flowchart illustrating a parallel-off process executed by the CPU 61 of the monitoring device 60. The parallel-off process will be explained below with reference to FIG. 5. This parallel-off process is executed when the voltage of the commercial power system is normal and the power storing unit 50 is charged.

First, the CPU 61 determines in step S201 whether or not a blackout occurs in the commercial power system. When the blackout of the commercial power system occurs, the primary-side voltage V1 becomes substantially zero, and becomes equal to or smaller than a threshold value. Hence, the CPU 61 compares the primary-side voltage V1 with the threshold value. Next, when the primary-side voltage V1 is equal to or smaller than the threshold value, it is determined that the blackout occurs (step S201: YES), and the process progresses to next step S202. When determining a blackout, the determination may be performed not based on the primary-side voltage V1, but the frequency of the commercial power system (for example, a system voltage zero-cross) may be detected, and an occurrence of a blackout may be detected based on the detected frequency. In addition, a blackout may be detected based on other determination criteria.

The CPU 61 outputs in step S202 a shutoff instruction to the contactor 33 to release the contactor 33.

The CPU 61 outputs in next step S203 a shutoff instruction to the remote shutoff breaker 32 to release the remote shutoff breaker 32. Hence, the home power system becomes a parallel-off condition from the commercial power system by the contactor 33 and the remote shutoff breaker 32.

The CPU 61 outputs in next step S204 a discharging instruction to the inverter 51 of the power storing unit 50. Accordingly, the inverter 51 performs DC-AC conversion, and the power stored in the battery 52 of the power storing unit 50 is supplied to the monitoring device 60 and the load 40 connected to the home power system. When the process in the step S204 completes, the CPU 61 ends the parallel-off process.

Figure 6:
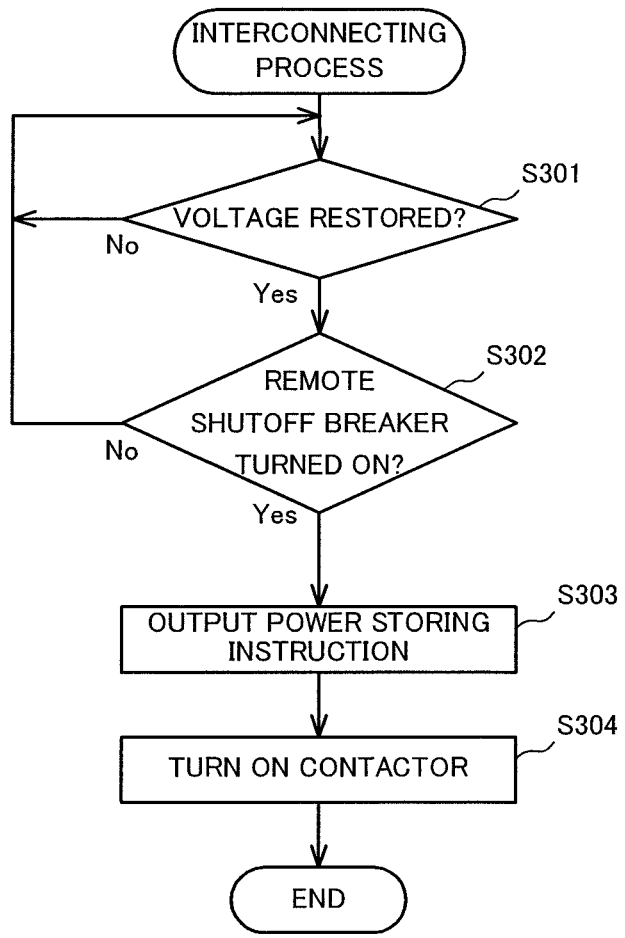
FIG. 6 is a flowchart illustrating an interconnecting process.

FIG. 6 is a flowchart illustrating an interconnecting process executed by the CPU 61 of the monitoring device 60. The interconnecting process will be explained below with reference to FIG. 6. This interconnecting process is executed when the commercial power system is recovered from a blackout.

First, the CPU 61 determines in step S301 whether or not the voltage of the commercial power system is recovered. When the commercial power system is recovered from a blackout, the voltage of the commercial power system becomes substantially a rated voltage. Hence, the CPU 61 compares the primary-side voltage V1 with the threshold value. Next, when the primary-side voltage V1 is larger than the threshold value, it is determined that the commercial power system has recovered (step S301: YES), and the process progresses to next step S302.

The CPU 61 determines in next step S302 whether or not the remote shutoff breaker 32 is turned on. As is clear from FIG. 2, when the remote shutoff breaker 32 shut off by the monitoring device 60 has not been re-turned on yet, no voltage appears at the secondary side of the remote shutoff breaker 32. Hence, the secondary-side voltage V2 becomes zero. Conversely, when the remote shutoff breaker 32 shutoff by the monitoring device 60 has been turned on by the user, the voltage of the commercial power system appears at the secondary side of the remote shutoff breaker 32. Hence, the secondary-side voltage V2 becomes substantially equal to the rated voltage.

The CPU 61 monitors the secondary-side voltage V2, and when the secondary-side voltage V2 is equal to or lower than the threshold value, determines that the remote shutoff breaker 32 has not been turned on (step S302: NO), and the process returns to the step S301. The processes in the steps S301, S302 are repeated until the determination result in the step S302 becomes positive.

Conversely, when the secondary-side voltage V2 becomes larger than the threshold value, the CPU 61 determines that the remote shutoff breaker 32 has been turned on (step S302: YES), and the process progresses to next step S303.

The CPU 61 outputs in the step S303 a power storing instruction to the inverter 51 of the power storing unit 50. Hence, power supply to the home power system from the power storing unit 50 is terminated.

The CPU 61 outputs in next step S304 a turn-on instruction to the contactor 33. Hence, the contactor 33 is turned on, and the home power system is interconnected with the commercial power system. Simultaneously, charging to the battery 52 of the power storing unit 50 starts. When the process in the step S304 completes, the CPU 61 ends the interconnecting process.

As explained above, according to this embodiment, the power supply switching device is formed by the monitoring device 60, the remote shutoff breaker 32, the contactor 33, and the voltage detecting transformers VT1, VT2. Next, after the commercial power system has recovered from a blackout, the monitoring device 60 checks whether or not the primary-side voltage V1 of the remote shutoff breaker 32 and the secondary-side voltage V2 thereof become the rated voltage (steps S301, S302). Subsequently, when both primary-side voltage V1 and secondary-side voltage V2 become the rated voltage (steps S301, S302: YES), the contactor 33 is actuated to interconnect the home power system with the commercial power system (step S304).

When the commercial power system is in a blackout condition, the primary-side voltage V1 becomes substantially zero. Hence, the remote shutoff breaker 32 and the contactor 33 do not interconnect the home power system with the commercial power system while the commercial power system has no voltage. Therefore, charging of the home power system upon recovery of the commercial power system from a blackout despite the user's intension can be suppressed. As a result, the safety of the user can be ensured.

In addition, when the remote shutoff breaker 32 has not been turned on by the user, the secondary-side voltage V2 becomes substantially zero. Hence, an interconnection of the home power system with the commercial power system despite the user's intention after the commercial power system recovers from a blackout can be suppressed. Hence, an interconnection of the home power system with the commercial power system and a charging despite the user's intension are avoidable. Therefore, the safety of the user can be ensured.

Conversely, after the primary-side voltage V1 becomes the rated voltage upon recovery of the commercial power system from a blackout, when the user turns on the remote shutoff breaker 32, both primary-side voltage V1 and secondary-side voltage V2 become the rated voltage, the interconnector turns on the contactor 33, and thus the home power system is instantaneously interconnected with the commercial power system. Hence, it becomes unnecessary for the user to perform a complex work other than a turn-on of the remote shutoff breaker 32. As a result, the safety of the commercial power system and that of the user can be ensured.

As explained above, according to this embodiment, a system interconnection despite the user's intension is avoidable, enabling a safe interconnection of the home power system including the power storing unit 50 with the commercial power system.

In addition, according to this embodiment, when the home power system is interconnected with the commercial power system, the monitoring device 60 outputs a power storing instruction to the power storing unit 50. Accordingly, the power storing unit 50 can be protected against unexpected power system interconnection.

Second Embodiment

Next, a second embodiment of the present disclosure will be explained with reference to the accompanying drawings. The same or equivalent structure as that of the first embodiment will be denoted by the same reference numeral, and the explanation thereof will be omitted or simplified.

Figure 7:
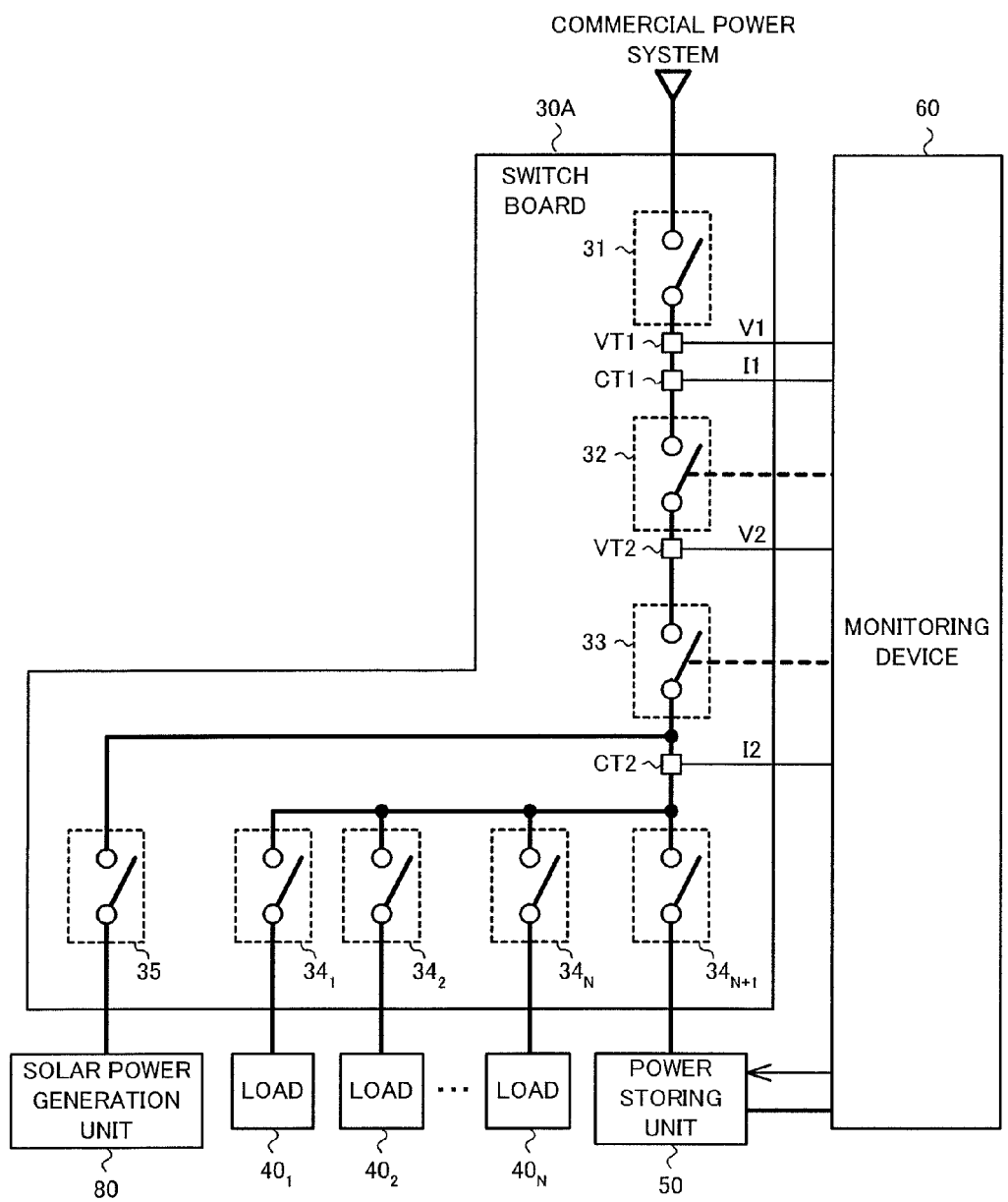
FIG. 7 is a block diagram illustrating a switch board, a load, and the like according to a second embodiment.

FIG. 7 is a block diagram illustrating a switch board 30A of this embodiment, a load 40 connected to a single-phase three-line commercial power system through the switch board 30A, and a solar power generation unit 80, or the like. As illustrated in FIG. 7, the switch board 30A of this embodiment differs from the switch board 30 of the first embodiment that the current transformer CT2 is provided at the secondary side of the contactor 33, and the solar power generation unit 80 is connected between the current transformer CT2 and the contactor 33 through the branched breaker 35.

The solar power generation unit 80 includes solar battery panels disposed on, for example, a roof of the house 10, and the inverter 51 that performs DC-AC conversion on electromotive force by the solar battery panels.

In this embodiment, the solar power generation unit 80 is connected to the home power system branched at the secondary side of the current transformer CT2. Hence, when the direction of the secondary-side current I2 of the current transformer CT2 is monitored, it becomes easy to determine whether or not power supplied from the power storing unit 50 to the home power system back-flows to the commercial power system. Accordingly, by rapidly detecting the reverse power flow to the commercial power system and controlling the inverter 51 of the power storing unit 50, the reverse power flow to the commercial power system becomes avoidable, and thus the safety of the commercial power system with a certain publicness can be ensured. Conversely, as to power from the solar power generation unit 80 permitted as reverse power flow to the commercial power system, any specific control is unnecessary, and thus the device structure can be simplified.

The embodiment of the present disclosure has been explained above, but the present disclosure is not limited to this embodiment. For example, according to the aforementioned embodiment, when the commercial power system is recovered from a blackout, the user operates the remote shutoff breaker 32, and in accordance with a trigger in which the secondary-side voltage V2 of the remote shutoff breaker 32 becomes the rated voltage (step S302: YES), the contactor 33 is actuated, and thus the home power system is interconnected with the commercial power system (step S304).

Figure 8:
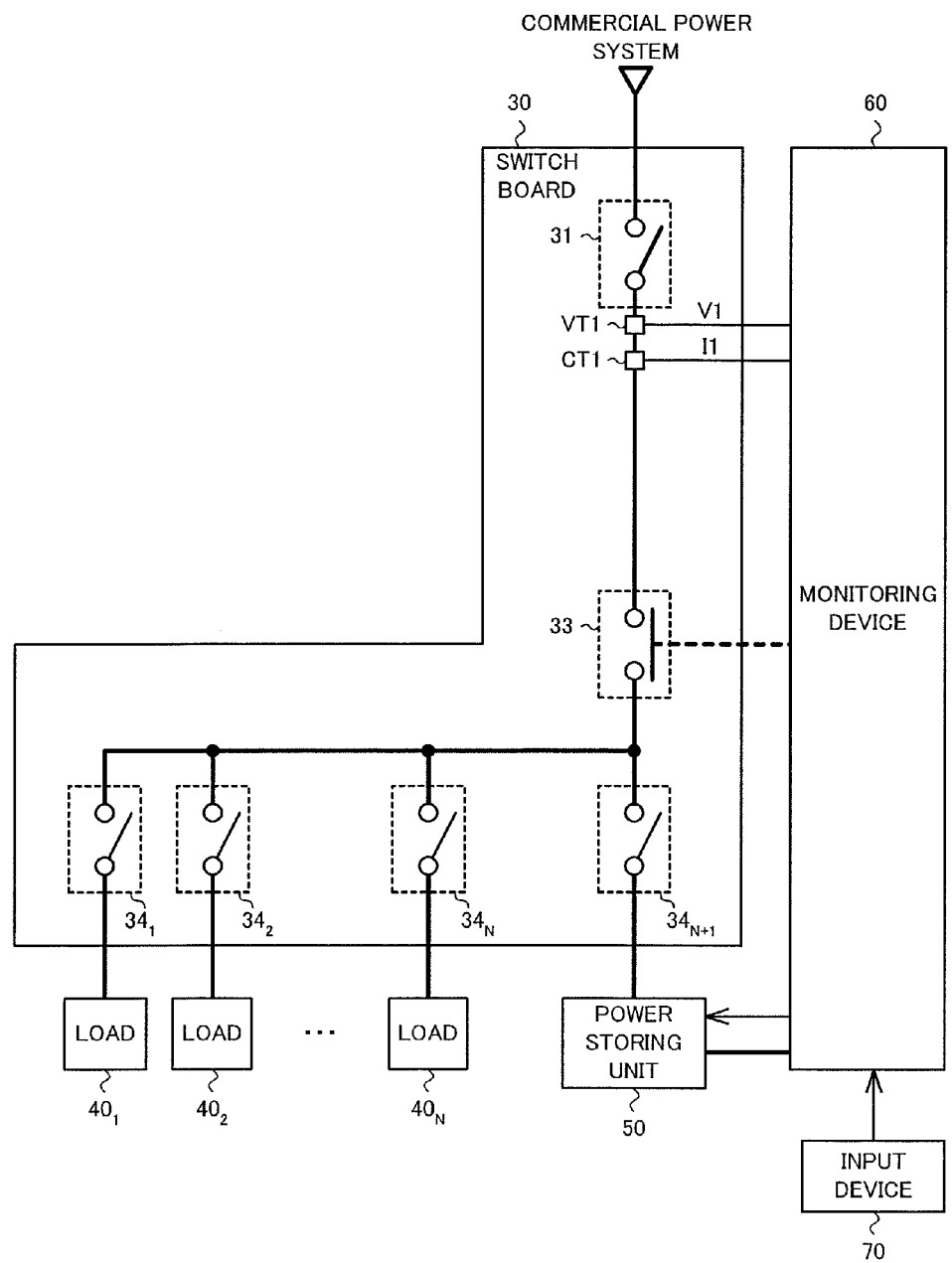
FIG. 8 is a block diagram illustrating an input device connected with a monitoring device.

The present disclosure is not limited to such an operation, and for example, as illustrated in FIG. 8, an input device 70 may be provided which is connected to the monitoring device 60, and when the user enters a turn-on instruction to the input device 70, the monitoring device 60 may actuate the contactor 33 to interconnect the home power system to the commercial power system. At this time, when a system interconnection is realized with a trigger that is an input instruction by the user instead of the operation of the remote shutoff breaker 32, the power supply switching device without the remote shutoff breaker 32 can be realized.

Figure 9:
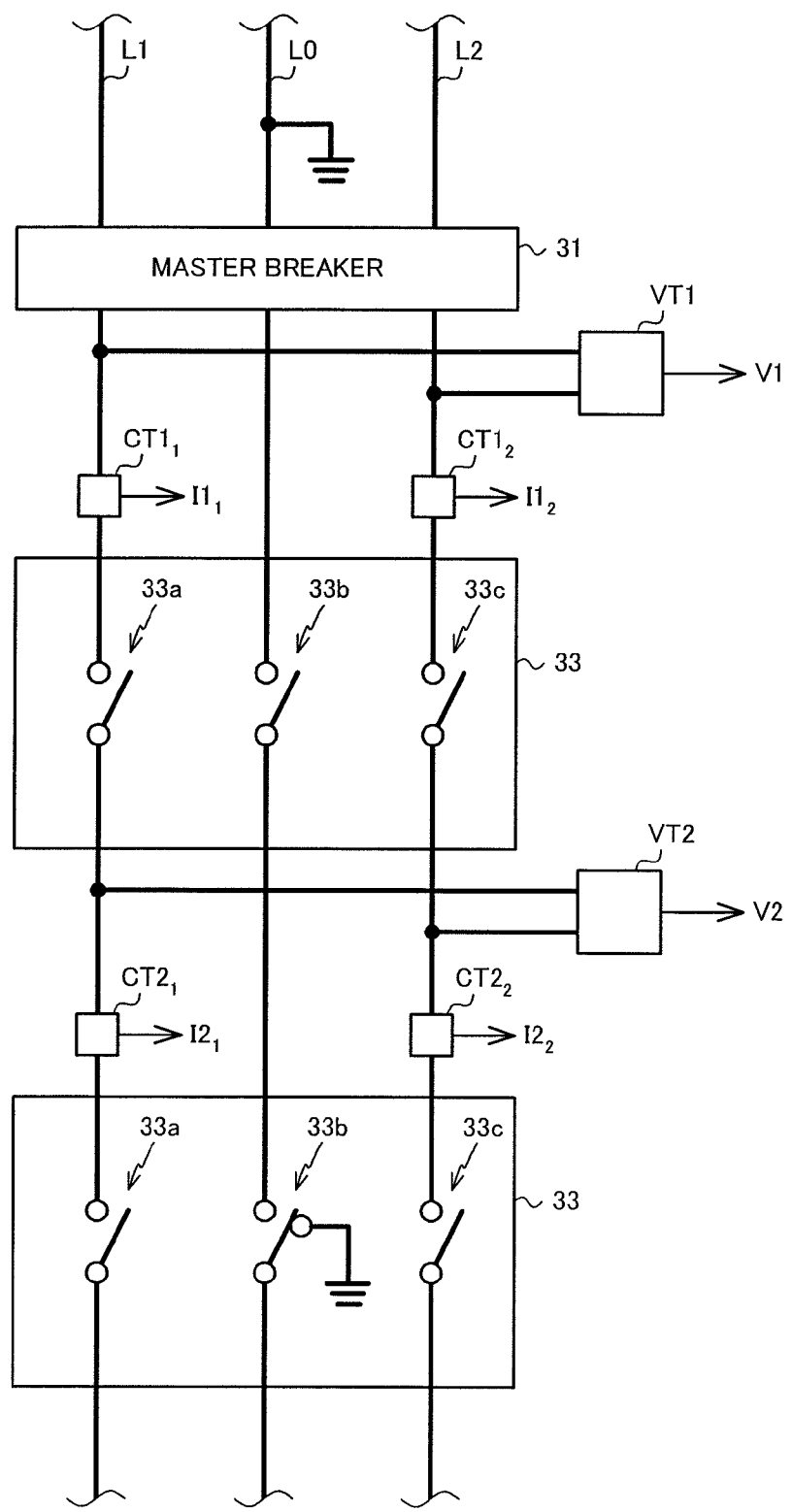
FIG. 9 is a diagram for explaining a modified example of the switch board.

In the aforementioned embodiment, the explanation was given of the case in which the remote shutoff breaker 32 is a breaker operable through the monitoring device 60. The present disclosure is not limited to this case, and for example, as illustrated in FIG. 9, instead of the remote shutoff breaker 32, the contactor 33 may be connected in series. The user is unable to directly actuate the contactor 33. Hence, when receiving a turn-on instruction from the user through the input device 70, the monitoring device 60 actuates the contactor 33.

In addition, when the remote shutoff breaker 32 and the contactor 33 include a contact indicating an open/close condition, the power system interconnection condition can be determined based on the primary-side voltage V1 and the contact of the contactor 33 without monitoring the system voltage. In this case, the voltage detecting transformer VT2 to measure the secondary-side voltage V2 may be omitted.

Figure 10:
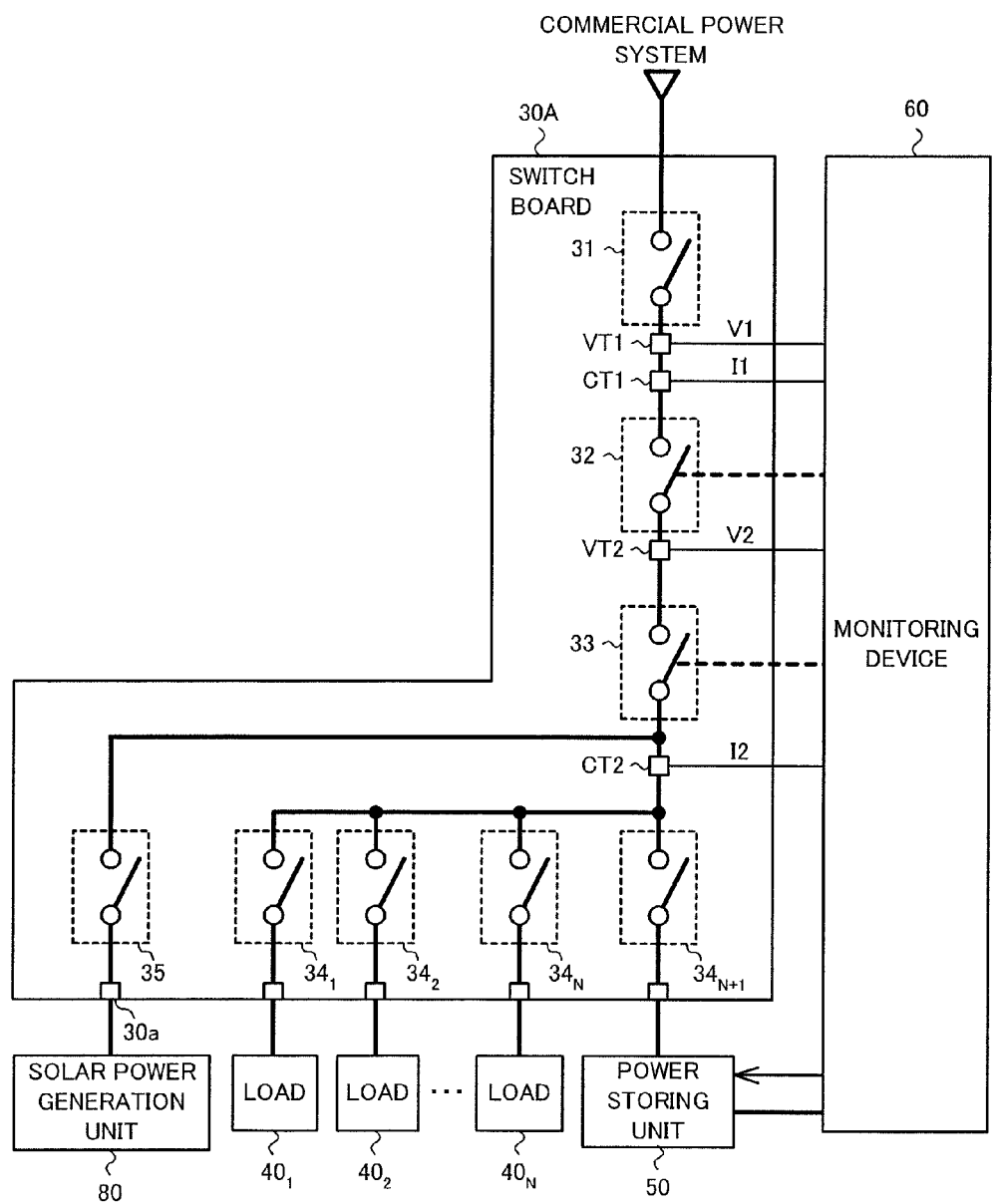
FIG. 10 is a block diagram for explaining a modified example of the switch board.

According to the aforementioned embodiment, the explanation was given of a case in which the load 40, the power storing unit 50, and the solar power generation unit 80 are directly connected to the branched breakers 34, 35. The present disclosure is, however, not limited to this case, and for example, as illustrated in FIG. 10, the load 40, or the like may be connected to the branched breakers 34, 35 through a terminal 30a.

In the aforementioned embodiments, the explanation was given of a case in which the monitoring device 60 is provided separately from the switch boards 30, 30A. The present disclosure is, however, not limited to this case, and a microcomputer as the monitoring device 60 may be applied, and such a microcomputer may be built in the switch boards 30, 30A.

The power storing unit 50 of the aforementioned embodiments may be a unit installed in the house 10 only for the purpose of backup, or may be a power storing unit including, for example, the battery of an electric vehicle connected to the home power system, and an inverter. In addition, the power storing unit 50 may be a power storing unit or the like including a wind power generation device and batteries.

In the aforementioned embodiments, the explanation was given of a case in which the monitoring device 60 actuates the contactor 33. The present disclosure is, however, not limited to this case, and when a latch-type contactor 33 is employed, the user becomes able to directly actuate the contactor 33.

The specifications of the above-explained remote shutoff breakers 32, contactor 33, and multiple branched breakers 34 vary depending on the scale, or the like of the house 10. Hence, it is preferable that those devices should be disposed at the secondary side of the master breaker 31.

Third Embodiment

Next, an explanation will be given of a third embodiment of the present disclosure with reference to the accompanying drawings. The same or equivalent structure as those of the aforementioned embodiments will be denoted by the same reference numeral, and the explanation thereof will be omitted or simplified.

Figure 11:
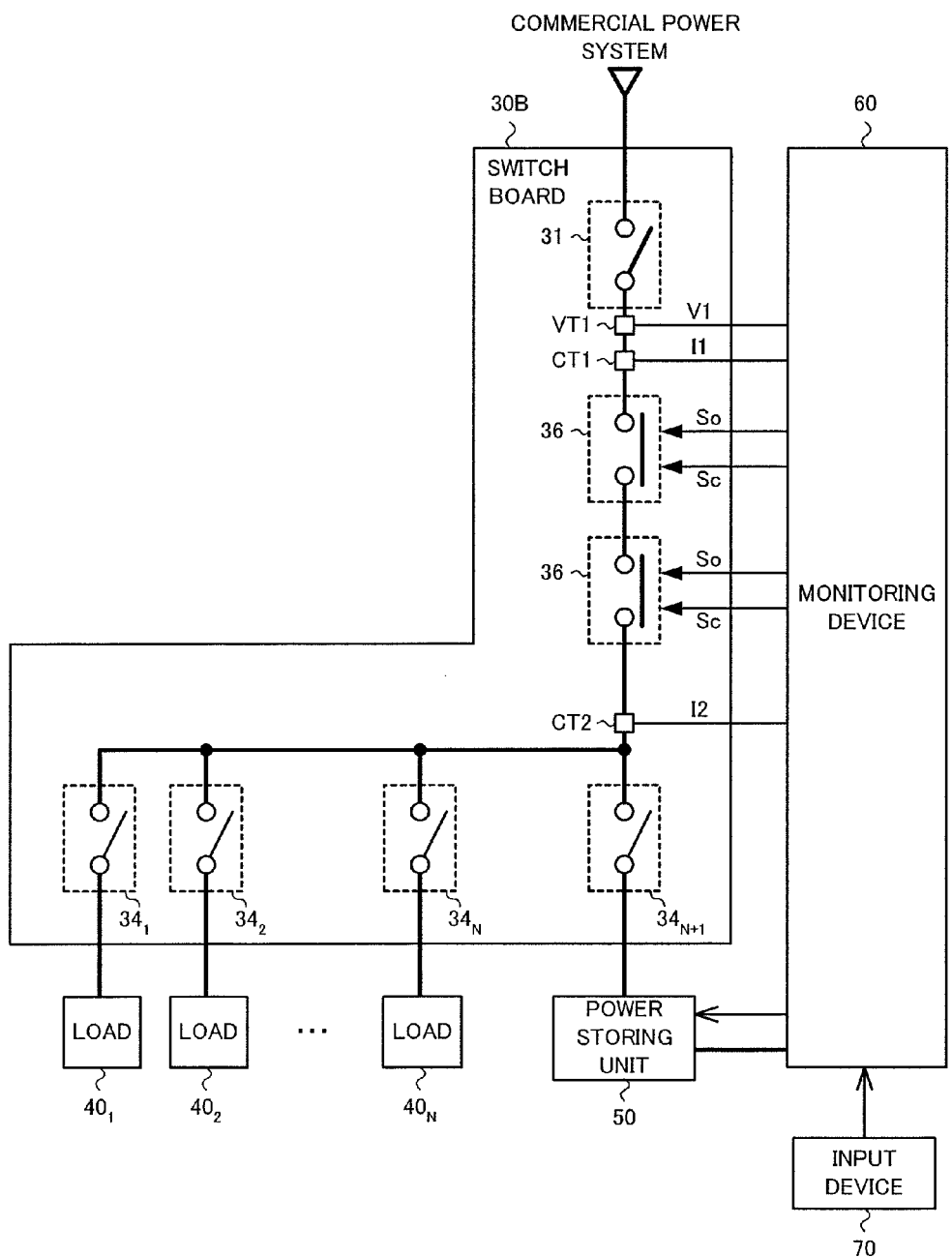
FIG. 11 is a block diagram illustrating a switch board, a load, and the like according to a third embodiment.

FIG. 11 is a block diagram illustrating a switch board 30B of this embodiment, the load 40 connected to a single-phase three-line commercial power system through the switch board 30B, or the like. As illustrated in FIG. 11, the switch board 30B of this embodiment differs from the switch boards 30, 30A of the aforementioned embodiments that two switches 36 are provided instead of the remote shutoff breaker 32 and the contactor 33.

The switch 36 is a latch-type switch to separate the home power system from the commercial power system. This switch 36 includes a tripping coil to separate contacts with each other, and a closing coil that causes the contacts to be in contact with each other. In addition, when the monitoring device 60 outputs a two-value pulse signal So, the switch 36 becomes opened in synchronization with the rising of this pulse signal. Still further, when the monitoring device 60 outputs a two-value pulse signal Sc, the switch becomes closed in synchronization with the rising of this pulse signal. After becoming closed, the switch 36 maintains the closed condition mechanically. Hence, even if power supply is terminated due to a blackout, interconnection of both power systems is maintained without an automatic parallel-off of the home power system from the commercial power system.

When a parallel-off instruction is entered to the input device 70 by the user, the monitoring device 60 causes the pulse signal So to be a high level for a certain time period. Hence, the respective switches 36 become opened, and thus the home power system is subjected to parallel-off from the commercial power system. In addition, when a turn-on instruction is entered to the input device 70 by the user, the monitoring device 60 causes the pulse signal Sc to be a high level for a certain time period. Hence, the respective switches 36 become closed, and thus the home power system is interconnected with the commercial power system.

Figure 12:
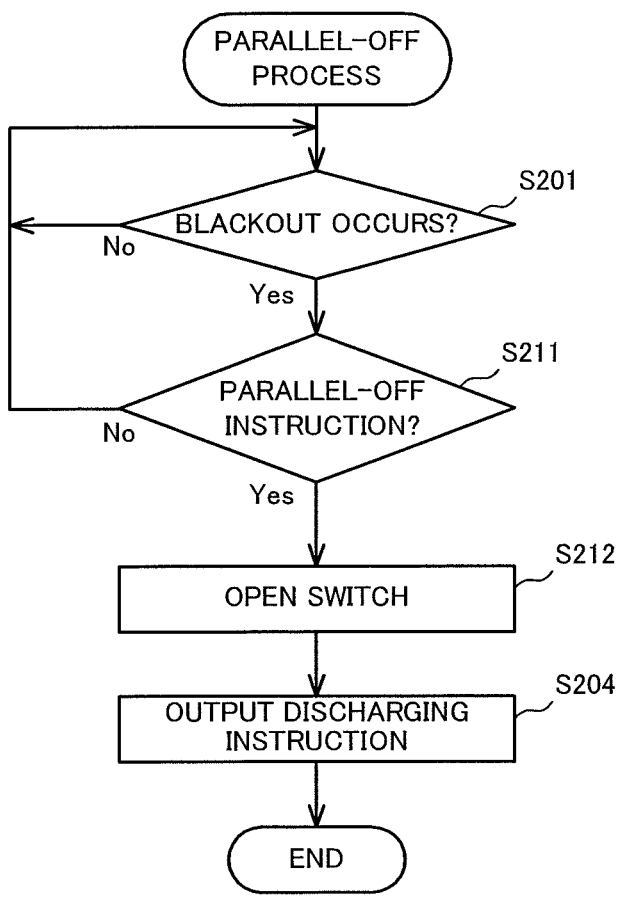
FIG. 12 is a flowchart illustrating a parallel-off process.

Next, an explanation will be given of a parallel-off process by the monitoring device 60 of this embodiment. FIG. 12 is a flowchart illustrating the parallel-off process executed by the CPU 61 of the monitoring device 60. The parallel-off process will be explained below with reference to FIG. 12. This parallel-off process is executed when the voltage of the commercial power system is normal and the power storing unit 50 is charged.

First, the CPU 61 determines in step S201 whether or not a blackout occurs in the commercial power system. When the blackout occurs in the commercial power system, the primary-side voltage V1 becomes substantially zero, and becomes equal to or smaller than the threshold value. Hence, the CPU 61 compares the primary-side voltage V1 with the threshold value. Next, when the primary-side voltage V1 is equal to or smaller than the threshold value, it is determined that a blackout occurs (step S201: YES), and the process progresses to next step S211.

The two respective switches 36 of this embodiment are normally closed type switches 36 mechanically maintaining a closed condition. Hence, the switches 36 maintain a closed condition after the blackout occurs until the parallel-off instruction is entered to the input device 70 by the user.

The CPU 61 determines in the step S211 whether or not the parallel-off instruction to parallel off the home power system from the commercial power system is entered to the input device 70. When the parallel-off instruction is not entered yet to the input device 70 by the user (step S211: NO), the CPU 61 returns the process to the step S201. Subsequently, until the determination in the step S211 becomes positive, the CPU 61 repeats the processes in the steps S201, S211.

Conversely, after the blackout occurs, when the parallel-off instruction is entered to the input device 70 by the user (step S211: YES), the CPU 61 progresses the process to step S212.

The CPU 61 opens in the step S212 both two switches 36. Hence, the home power system is subjected to parallel-off from the commercial power system by the two switches 36.

The CPU 61 outputs in next step S204 a discharging instruction to the inverter 51 of the power storing unit 50. Accordingly, the inverter 51 performs DC-AC conversion, and power stored in the battery 52 of the power storing unit 50 is supplied to the monitoring device 60 and the load 40 connected to the home power system. When the process in the step S204 completes, the CPU 61 ends the parallel-off process.

Figure 13:
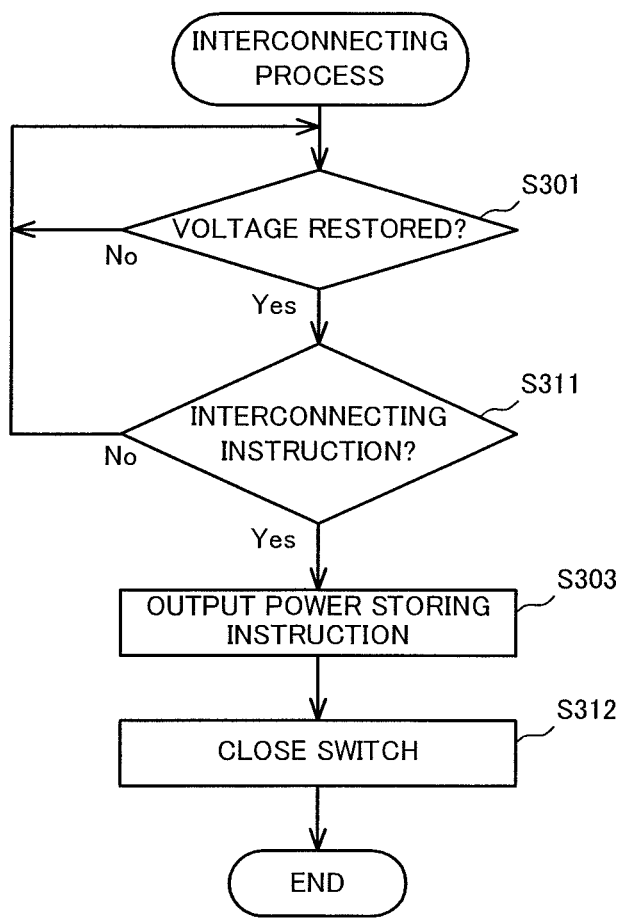
FIG. 13 is a flowchart illustrating an interconnecting process.

FIG. 13 is a flowchart illustrating an interconnecting process executed by the CPU 61 of the monitoring device 60. The interconnecting process will be explained below with reference to FIG. 13. This interconnecting process will be executed when the commercial power system is recovered from a blackout.

First, the CPU 61 determines in step S301 whether or not the voltage of the commercial power system has been restored. When the commercial power system is recovered from a blackout, the voltage of the commercial power system becomes substantially equal to the rated voltage. Hence, the CPU 61 compares the primary-side voltage V1 with the threshold value. Next, when the primary-side voltage V1 is larger than the threshold voltage, it is determined that the commercial power system has recovered (step S301: YES), and the process progresses to next step S311.

The CPU 61 determine in next step S311 whether or not an interconnecting instruction to interconnect the commercial power system to the home power system is entered to the input device 70. When the interconnecting instruction is not entered yet to the input device 70 by the user (step S311: NO), the CPU 61 returns the process to the step S301. Subsequently, the CPU 61 repeats the processes in the steps S301, S311 until the determination in the step S311 becomes positive.

Conversely, when the interconnecting instruction is entered to the input device 70 by the user after the blackout occurs (step S311: YES), the CPU 61 progresses the process to step S303.

The CPU 61 outputs in the step S303 a power storing instruction to the inverter 51 of the power storing unit 50. Hence, power supply to the home power system from the power storing unit 50 is terminated.

The CPU 61 sets in the next step S312 the pulse signal Sc to be a high level, thereby closing the respective switches 36. Hence, the home power system is interconnected with the commercial power system. Simultaneously, charging of the battery 52 of the power storing unit 50 starts.

The two respective switches 36 of this embodiment are each a normally closed type switch 36 that mechanically maintains a closed condition. Hence, the switches 36 maintain the closed condition until the user enters a parallel-off instruction to the input device 70 after a blackout occurs. When the switches 36 are closed, even if the pulse signal Sc becomes a high level through the process in the step S312, the switches 36 are not actuated, but the closed condition is maintained as it is. When the process in the step S312 completes, the CPU 61 ends the interconnecting process.

As explained above, according to this embodiment, when a blackout occurs in the commercial power system, the CPU 61 determines whether or not a parallel-off instruction is entered to the input device 70 by the user (step S211). Only when the user gives the parallel-off instruction, the switches 36 are opened, and the home power system is subjected to parallel-off from the commercial power system (step S212), and then power supply from the power storing unit 50 to the load 40 starts. At this time, discharging of the power storing unit 50 despite the user's intension can be prevented. As a result, the home power system is not unnecessarily paralleled off from the commercial power system, and the home power system can be stably operated in accordance with the user's intension.

When, in particular, in the case of a blackout for a several seconds at which it is difficult for the user to intervene, the home power system is not meaninglessly paralleled off from the commercial power system. Hence, the FRT (Fault Ride Through) performance can be remarkably improved.

In addition, when a blackout for a several minutes occurs in the commercial power system due to lightning strike or the like, if the switch is an AC latch type, the home power system is subjected to parallel off from the commercial power system, but if the switch is a mechanical latch type, an interconnection between the commercial power system and the home power system is maintained. Hence, when the commercial power system has recovered after a blackout for several minutes, the home power system is simultaneously recovered with the recovery of the commercial power system. Hence, the FRT performance can be improved.

More specifically, when a blackout for several seconds or several minutes occurs in the commercial power system while the user is out, but the commercial power system is recovered subsequently, the user can normally use the electric apparatuses to which power is supplied through the home power system after the user returns the home. In addition, automatic discharging of the power storing unit 50 does not start despite the user's intension, and thus the reduction of the lifetime of the power storing unit 50 due to unnecessary discharging can be avoided. As a result, an inexpensive power storing unit 50 becomes applicable. Still further, the running costs of the power storing unit 50 can be reduced.

The switches 36 of the switch board 30B of this embodiment is a normally closed type switches that mechanically maintain a closed condition once closed. Hence, power consumption to maintain the interconnection between the commercial power system and the home power system can be suppressed.

According to the switch board 30B of this embodiment, the two switches 36 are connected in series. Hence, even if the contact of the one switch 36 is fused, the home power system can be paralleled off from the commercial power system. The present disclosure is, however, not limited to this case, and the switch board may be formed by equal to or greater than three switches 36 connected in series.

According to this embodiment, the explanation was given of the case in which the switches 36 are normally closed type switches that mechanically maintain a closed condition once closed. The present disclosure is, however, not limited to this case, and the switches 36 may be normally opened switches that mechanically maintain an opened condition once opened. In this case, power consumption to maintain the parallel-off between the commercial power system and the home power system can be suppressed.

Figure 14:
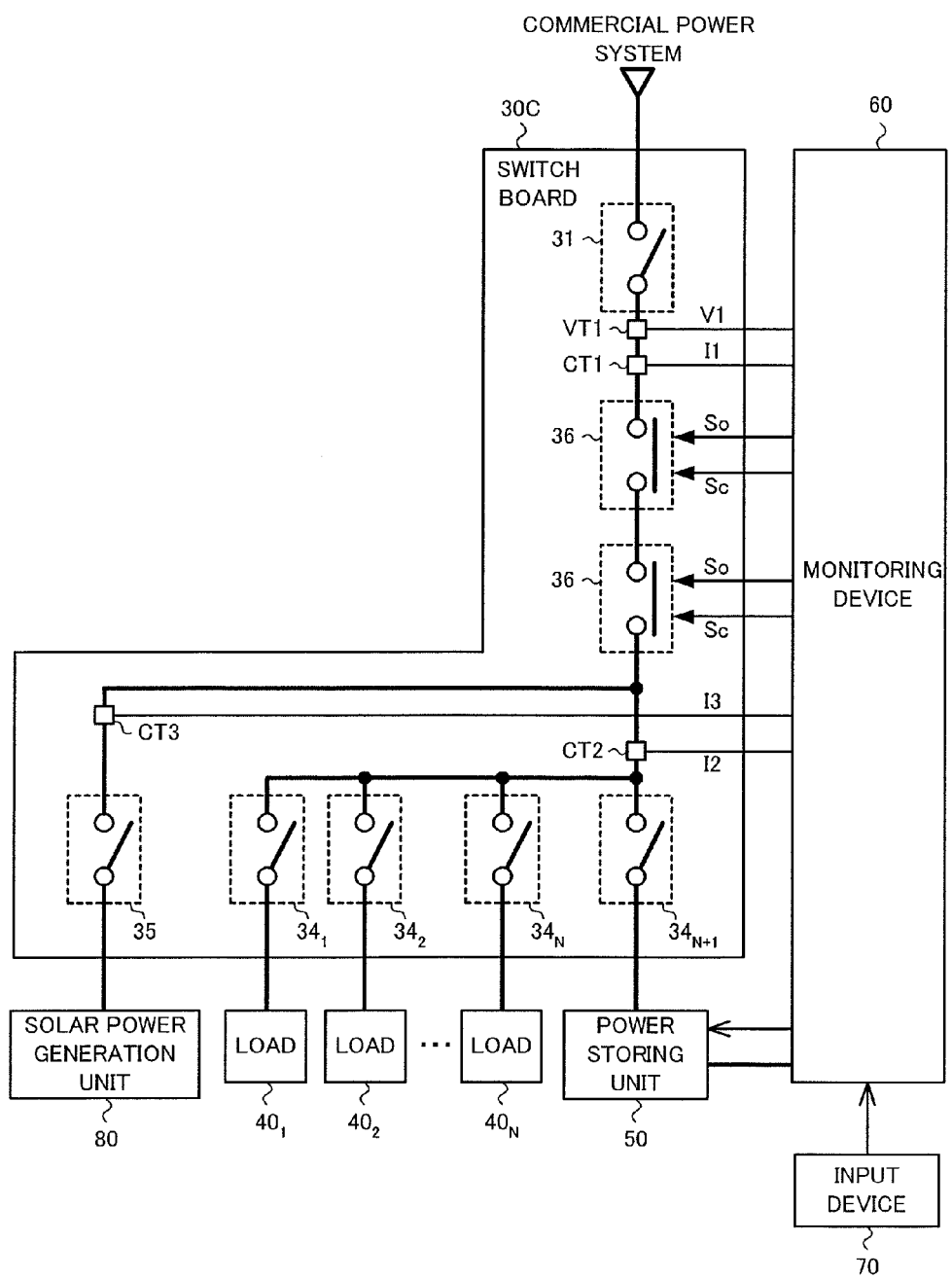
FIG. 14 is a block diagram illustrating a switch board according to a modified example.

In this embodiment, the explanation was given of the case in which the home power system is formed by the loads only. The present disclosure is, however, not limited to this case, and for example, like a switch board 30C illustrated in FIG. 14, the solar power generation unit 80 may be connected to the secondary side of the switches 36 connected in series. According to the switch board 30C, when the power storing unit 50 terminates discharging through the process in the step S303, the solar power generation unit 80 starts charging the power storing unit 50. In addition, electric power selling of extra power by the solar power generation unit 80 starts through the process in the step S312.

Fourth Embodiment

Next, an explanation will be given of a fourth embodiment of the present disclosure with reference to the accompanying drawings. The same or equivalent structure as those of the aforementioned embodiments will be denoted by the same reference numeral, and the explanation thereof will be omitted or simplified.

Figure 15:
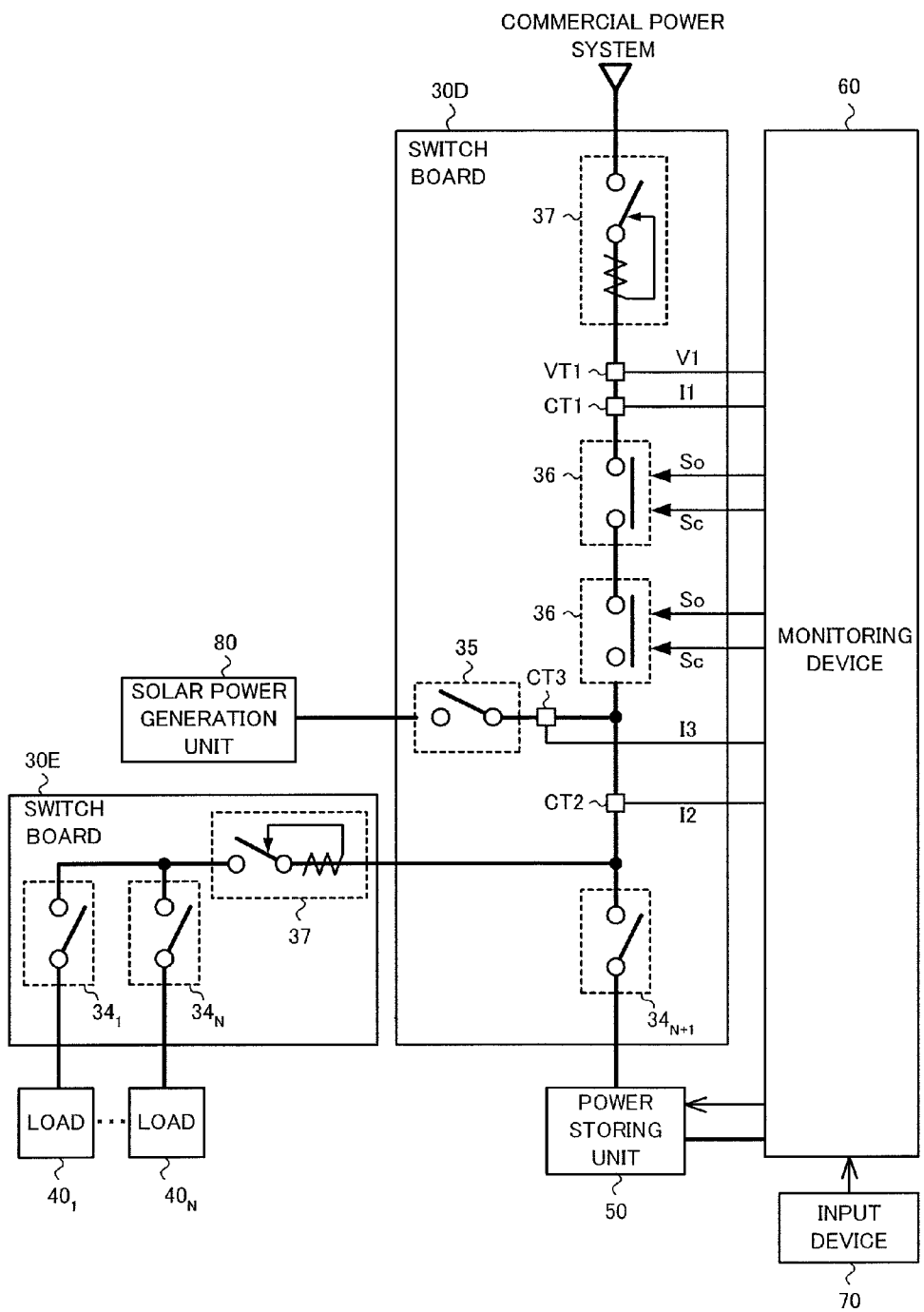
FIG. 15 is a block diagram illustrating a switch board, a load, and the like according to a fourth embodiment.

FIG. 15 is a block diagram illustrating switch boards 30D, 30E of this embodiment, the load 40 connected to a single-phase three-line commercial power system through the switch boards 30D, 30E, or the like. As illustrated in FIG. 15, this embodiment differs from the aforementioned embodiments that the load 40 is connected to the commercial power system through the two switch boards 30D, 30E, and an ELCB (Earth Leakage Circuit Breaker) 37 is provided instead of the master breaker 31.

The switch board 30D includes the ELCB 37, the two switches 36, the branched breaker 34 connected with the power storing unit 50, and the branched breaker 35 connected with the solar power generation unit 80. In addition, the switch board 30E includes the ELCB 37 connected at the primary side of the branched breaker 34, and the branched breaker 34 connected with the load 40.

The ELCB 37 of the switch board 30D is actuated when the zero-phase voltage of the commercial power system becomes equal to or larger than a threshold value. When the ELCB 37 is actuated, the home power system is disconnected from the commercial power system. In addition, the ELCB 37 of the switch board 30E is actuated when a zero-phase current flowing through the load 40 becomes equal to or larger than a threshold value. When the ELCB 37 is actuated, the load 40 is disconnected from the commercial power system.

Figure 16:
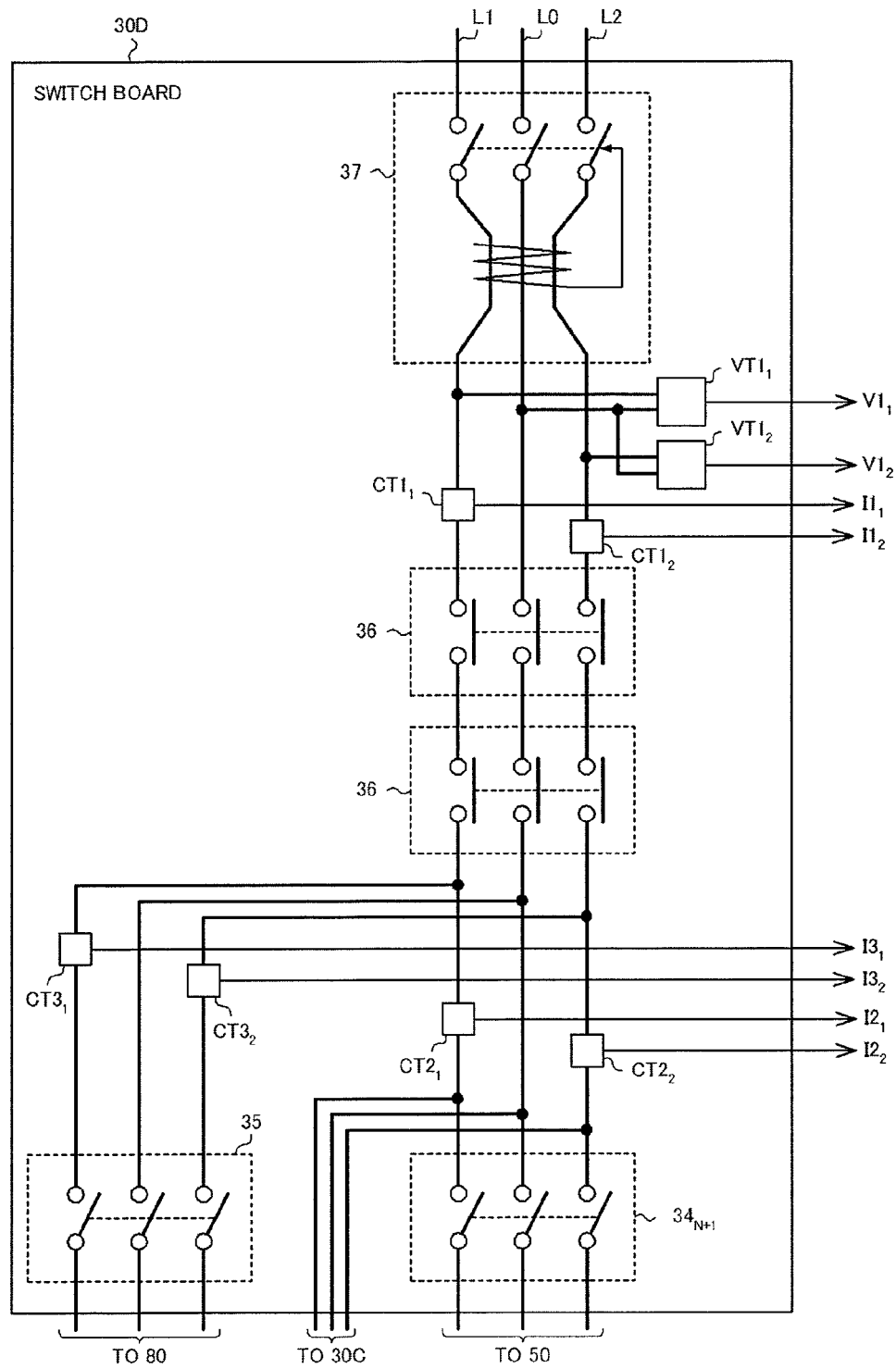
FIG. 16 is a wiring diagram of a switch board.

FIG. 16 is a wiring diagram of the switch board 30D. As illustrated in FIG. 16, the switch board 30D includes voltage detecting transformers $VT1_1$, $VT1_2$, and current transformers $CT1_1$, $CT1_2$, $CT2_1$, $CT2_2$, $CT3_1$, $CT3_2$.

The primary side of the voltage detecting transformer $VT1_1$ is connected to the neutral line L0 and the power supply line L1 at the secondary side of the ELCB 37. In addition, the primary side of the voltage detecting transformer $VT1_2$ is connected to the neutral line L0 and the power supply line L2 at the secondary side of the ELCB 37. Voltages $V1_1$, $V1_2$ proportional to the voltages applied to the primary sides of those voltage detecting transformers $VT1_1$, $VT1_2$ appear at the secondary sides of the voltage detecting transformers $VT1_1$, $VT1_2$.

The primary sides of the current transformers $CT1_1$, $CT1_2$ are connected to the power supply lines L1, L2 at the secondary side of the ELCB 37. The primary sides of the current transformers $CT2_1$, $CT2_2$ are connected to the power supply lines L1, L2 at the primary side of the branched breaker 34 connected with the power storing unit 50. The primary sides of the current transformers $CT3_1$, $CT3_2$ are connected to the power supply lines L1, L2 at the primary side of the branched breaker 35 connected with the solar power generation unit 80.

The currents at the respective secondary sides of the current transformers become values proportional to the currents of the power supply lines L1, L2 connected with the primary side of the current transformers. Hence, currents $I1_1$, $I1_2$ at the secondary sides of the current transformers $CT1_1$, $CT1_2$ become values proportional to the current flowing between the commercial power system and the home power system. In addition, currents $I2_1$, $I2_2$ at the secondary side of the current transformers $CT2_1$, $CT2_2$ become a value proportional to a current that is a total of a charging current flowing into the power storing unit 50 or a discharging current flowing out from the power storing unit 50 and a consumed current by the load 40 in the house. Still further, currents $I3_1$, $I3_2$ at the secondary side of the current transformers $CT3_1$, $CT3_2$ become a value proportional to a generated power current flowing out from the solar power generation unit 80.

As to the direction of the current in each current transformer, the direction from the commercial power system to each device of the home power system is defined as a positive direction.

When secondary-side currents $I1_N$, $I2_N$, and $I3_N$ of respective current transformers are monitored, it becomes possible to detect power subjected to back-flow from the solar power generation unit 80 to the commercial power system. When, for example, the secondary side current $I2_N$ is equal to or larger than zero, it can be determined that stored power does not back-flow to the commercial power system.

Figure 17:
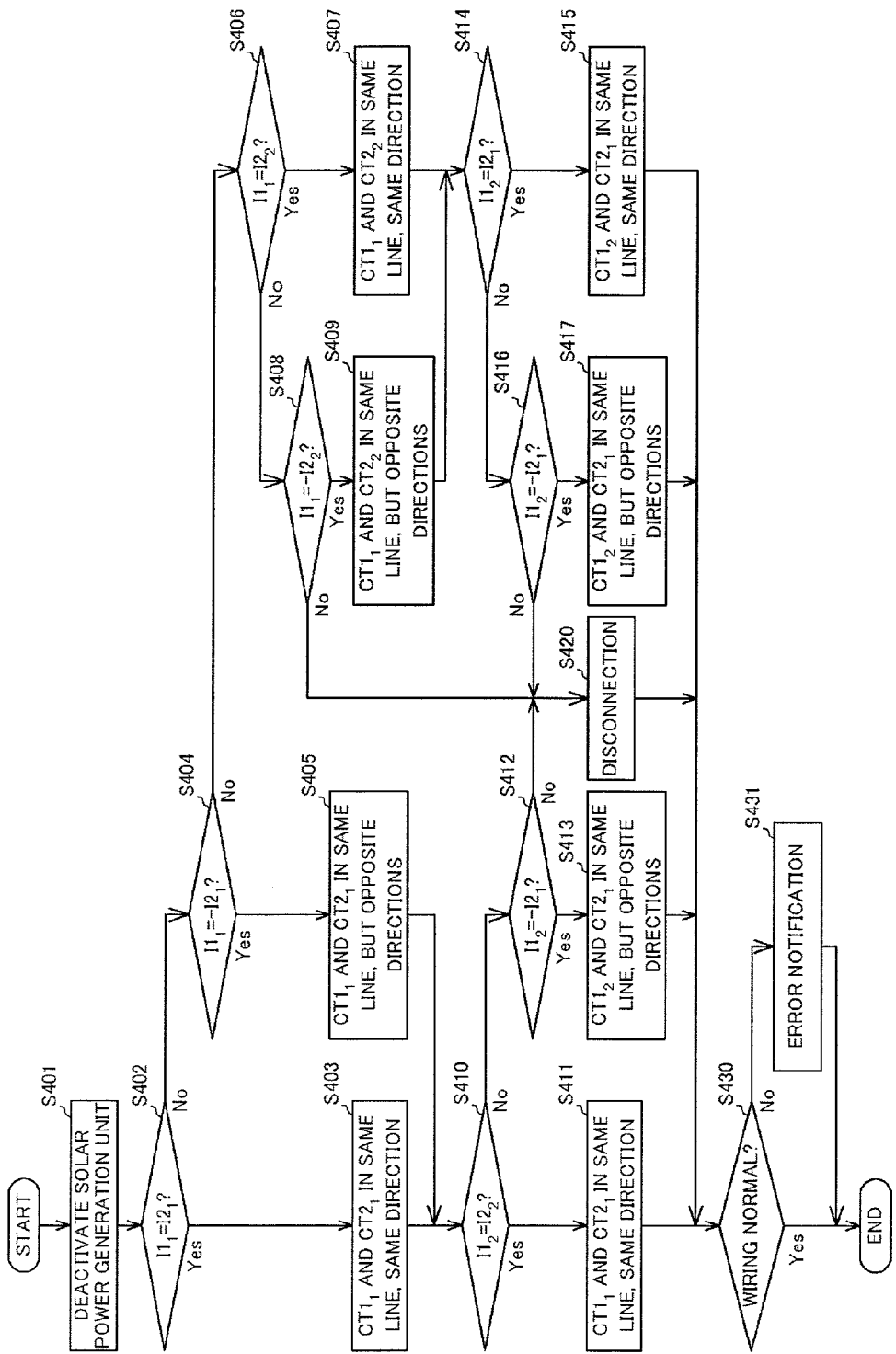
FIG. 17 is a flowchart illustrating a false connection detecting process.

In addition, when the secondary-side currents $I1_N$, $I2_N$, and $I3_N$ are monitored, a false connection of any current transformer CT1 to CT3 can be detected. An explanation will be below given of a false connection detecting process executed by the monitoring device 60 with reference to the flowchart of FIG. 17. This false connection detecting process is executed when the user enters a start instruction to the input device 70.

First, the monitoring device 60 deactivates the solar power generation unit 80 (step S401). Accordingly, a relationship $I1_N = I2_N$ is satisfied. Hence, a false connection becomes detectable based on a relative value of the secondary-side current $I2_N$ to the value of the secondary-side current $I1_N$.

Next, the monitoring device 60 compares the secondary-side current $I1_1$ with the secondary-side current $I2_1$ (step S402), and when both values are equal (step S402: YES), it is determined that the directions of the current transformer $CT1_1$ and the current transformer $CT1_2$, and, the connected power lines are proper (step S403).

When the value of the secondary-side current $I1_1$ and the value of the secondary-side current $I2_1$ are different (step S402: NO), the monitoring device 60 compares the value of the secondary-side current $I1_1$ with a value obtained by multiplying the value of the secondary-side current $I2_1$ by $-1$ (step S404). Next, when both values are equal (step S404: YES), it is determined that the directions of the current transformer $CT1_1$ and the current transformer $CT2_1$ are different but the connected power supply lines are proper (step S405).

When the value of the secondary-side current $I1_1$ is compared with the value obtained by multiplying the value of the secondary-side current $I2_1$ by $-1$, and both values are different (step S404: NO), the monitoring device 60 compares the value of the secondary-side current $I1_1$ with the value of the secondary-side current $I2_2$ (step S406). Next, when both values are equal (step S406: YES), the monitoring device 60 determines that the directions of the current transformer $CT1_1$ and the current transformer $CT2_2$, and, the connected power supply lines are proper (step S407).

When the value of the secondary-side current $I1_1$ is compared with the value of the secondary-side current $I2_2$ and both values are different (step S406: NO), the monitoring device 60 compares the value of the secondary-side current $I1_1$ with a value obtained by multiplying the value of the secondary-side current $I2_2$ by $-1$ (step S408). Next, when both values are equal (step S408: YES), the monitoring device 60 determines that the directions of the current transformer $CT1_1$ and the current transformer $CT2_2$ are different but the connected power supply lines are proper (step S409).

In addition, the monitoring device 60 compares the value of the secondary-side current $I1_1$ with a value obtained by multiplying the value of the secondary-side current $I2_2$ by $-1$, and when both values are different (step S408: NO), the monitoring device determines that a disconnection of the current transformer is occurring (step S420).

When determining that the directions of the current transformer $CT1_1$ and the current transformer $CT2_1$ and the connected power supply lines are proper (step S403) or when determining that the directions of the current transformer $CT1_1$ and the current transformer $CT2_1$ are different but the connected power supply lines are proper (step S405), the monitoring device 60 compares the value of the secondary-side current $I1_2$ with the value of the secondary-side current $I2_2$ (step S410). Next, when both values are equal (step S410: YES), the monitoring device 60 determines that the directions of the current transformer $CT1_2$ and the current transformer $CT2_2$ and the connected power supply lines are proper (step S411).

The monitoring device 60 compares the value of the secondary-side current $I1_2$ with the value of the secondary-side current $I2_2$, and when both values are different (step S410: NO), the monitoring device compares the value of the secondary-side current $I1_2$ with the value obtained by multiplying the value of the secondary-side current $I2_1$ by $-1$ (step S412). Next, when both values are equal (step S412: YES), the monitoring device 60 determines that the directions of the current transformer $CT1_2$ and the current transformer $CT2_1$ are different but the connected power supply lines are proper (step S413).

In addition, the monitoring device 60 compares the value of the secondary-side current $I1_2$ with the value obtained by multiplying the value of the secondary-side current $I2_1$ by −1, and when both values are different (step S412: NO), the monitoring device determines that a disconnection of the current transformer is occurring (step S420).

When it is confirmed that the directions of the current transformer $CT1_1$ and the current transformer $CT2_2$ and the connected power supply lines are proper (step S407), or when it is confirmed that the directions of the current transformer $CT1_1$ and the current transformer $CT2_2$ are different but the connected power supply lines are proper (step S409), the monitoring device 60 compares the value of the secondary-side current $I1_2$ with the value of the secondary-side current $I2_1$ (step S414). Subsequently, when both values are equal (step S414: YES), the monitoring device 60 determines that the directions of the current transformer $CT1_2$ and the current transformer $CT2_1$ and the connected power supply lines are proper (step S415).

The monitoring device 60 compares the value of the secondary-side current $I1_2$ with the value of the secondary-side current $I2_1$, and when both values are different (step S414: NO), the monitoring device 60 compares the value of the secondary-side current $I1_2$ with the value obtained by multiplying the value of the secondary-side current $I2_1$ by −1 (step S416). Next, when both values are equal (step S416: YES), the monitoring device 60 determines that the directions of the current transformer $CT1_2$ and the current transformer $CT2_1$ are different but the connected power supply lines are proper (step S417).

The monitoring device 60 compares the value of the secondary-side current $I1_2$ with the value obtained by multiplying the value of the secondary-side current $I2_1$ by −1, and when both values are different (step S426: NO), the monitoring device 60 determines that a disconnection of the current transformer is occurring (step S420).

After the aforementioned confirmation, the monitoring device 60 determines whether or not a connection of the current transformer is proper (step S430). Next, when determining that the connection is proper (step S430: YES), the monitoring device 60 ends the false connection detecting process. Conversely, when determining that the connection is improper (step S430: NO), the monitoring device 60 notifies the user of an error (step S431), and then ends the false connection detecting process. In the step S430, when it is determined that the direction of the current transformer is opposite and when it is determined that a disconnection is occurring, it is determined that the connection is improper. The case in which it is determined that the disconnection is occurring includes a case in which the current transformer is connected to the neutral line L0.

As explained above, according to this embodiment, the load 40 is connected to the commercial power system through the switch board 30D retaining thereinside the two switches 36, and the switch board 30E retaining thereinside the branched breaker 34 connected with the load 40. In general, a latch type switch 36 is often larger than normal contactors. Hence, if the switch board is formed using a latch type switch, it is difficult to utilize a normal-size casing. According to this embodiment, however, when the switch board is divided into multiple units, each switch board unit can be formed using a conventional casing with a standard size. Therefore, the manufacturing costs of the switch board can be reduced.

The switch board 30E of this embodiment employs the same structure as that of a switch board utilized in typical homes. Hence, by simply providing the switch board 30D of this embodiment at the primary side of the conventional switch board in a typical house, the home power system of this embodiment can be established. Therefore, the home power system of this embodiment can be realized at low costs.

In this embodiment, the switch board forming the home power system includes the two switch boards 30D, 30E. Hence, each switch board can be downsized, and the degree of freedom for disposition can be enhanced.

According to this embodiment, the explanation was given of the case in which the switch board 30D includes the ELCB 37, the two switches 36, and the branched breakers 34, 35, while the switch board 30E includes the ELCB 37, and the branched breaker 34. The present disclosure is, however, not limited to this structure, and the elements retained in the switch boards 30D, 30E, respectively, can be selected freely.

The casing utilized for the switch board 30E, 30D can be formed of a metal or a plastic. According to this embodiment, since the switch board includes the two switch boards 30D, 30E, for example, the casing of the switch board 30D retaining thereinside the switch 36 that has a possibility of firing due to layer short can be formed of a metal, while the casing of the other switch board 30E can be formed of a plastic. Alternatively, when the casing of the switch board 30D retaining thereinside the switch 36 is formed of a plastic, a fire-safety countermeasure like enclosure of the switch 36 by metal plates can be performed on only the switch board 30D.

According to such a structure, the manufacturing costs of the switch board can be reduced while improving the safety. In addition, the amount of metals utilized in the whole switch board can be reduced, which becomes a care for the global environment. Still further, when the casing of the switch board is formed of a plastic, the switch board can be made lightweight, and thus the degree of freedom for a disposition location can be further improved.

According to this embodiment, a false connection of the current transformer and a disconnection thereof are automatically detected. Hence, an initial trouble due to an installation and improvement of the home power system become preventable beforehand. A change of the direction of the current transformer and a reinstallation thereof are relatively simple works, if a false connection can be detected beforehand, it becomes unnecessary to deactivate electric facilities for a long time.

According to this embodiment, the false connection detecting process is performed after the solar power generation unit 80 is deactivated. The present disclosure is, however, not limited to this structure, and when the solar power generation unit 80 is generating power, if the switches 36 are opened, a false connection of the current transformers CT3, CT2 can be likewise carried out. The solar power generation unit 80 itself can control the direction of the current flow. Hence, the false connection detecting process can be performed with reference to the secondary-side current of the current transformer CT3.

The present disclosure permits various embodiments and modifications thereof without departing from the broadest scope and spirit of the present disclosure. In addition, the aforementioned embodiments are to explain the present disclosure, and are not to limit the scope and spirit of the present disclosure. That is, the scope and spirit of the present disclosure are defined by the appended claims rather than the embodiments. Still further, various modifications permitted within the range of the claims and the equivalent range thereto are also within the scope and spirit of the present disclosure.

INDUSTRIAL APPLICABILITY

The power supply switching device of the present disclosure is suitable for switching between a commercial power supply and a power supply installed in a house. In addition, the switch board of the present disclosure is suitable for a distribution of power to loads.

The invention claimed is:

1. A power supply switching device comprising:
a first parallel-off unit that parallels off a power storage and a load from a power system;
a first voltage detector which is disposed at a primary side of the first parallel-off unit, and which detects a voltage of the power system; and
a controller configured to determine whether the voltage detected by the first voltage detector indicates that the power system has recovered from a blackout when the first parallel-off unit is performing parallel-off from the power system on the power storage and the load;
wherein, when the controller determines that the voltage detected by the first voltage detector indicates that the power system has recovered from the blackout, the controller actuates the first parallel-off unit to interconnect the power storage and the load with the power system based on an instruction given by a user.

2. The power supply switching device according to claim 1, wherein the controller actuates the first parallel-off unit to parallel off from the power system the power storage and the load upon absence of a detection of the voltage of the power system by the first voltage detector.

3. The power supply switching device according to claim 2, further comprising a second parallel-off unit which is disposed at the primary side of the first parallel-off unit and which parallels off from the power system the power storage and the load,
wherein the controller actuates the second parallel-off unit together with the first parallel-off unit to parallel off the power storage and the load from the power system.

4. The power supply switching device according to claim 3, further comprising a second voltage detector which is disposed between the first parallel-off unit and the second parallel-off unit, and which detects a voltage of the power system,
wherein the controller determines that the user has given an instruction, and interconnects the power storage and the load with the power system when the user operates the second parallel-off unit and the second voltage detector detects the voltage of the power system.

5. The power supply switching device according to claim 1, wherein the first parallel-off unit is a latch type switch.

6. The power supply switching device according to claim 1, wherein the first parallel-off unit is an earth leakage circuit breaker.

7. The power supply switching device according to claim 1, further comprising:
a current measurer that measures a current supplied to the load; and
a solar battery connected at the primary side of the current measurer.

8. The power supply switching device according to claim 1, wherein the power storage is distributed power supplies.

9. A switch board comprising:
the power supply switching device according to claim 1; and
a casing that retains thereinside the power supply switching device.

10. The switch board according to claim 9, wherein the casing comprises:
a first casing that retains thereinside the first parallel-off unit; and
a second casing that retains thereinside a breaker which individually disconnects the load from the power system.

11. The switch board according to claim 9, further comprising:
a first current detector that detects a current supplied to the switch board from the power system;
a second current detector that detects a current supplied to the load and the power storage; and
a wiring condition detector which compares the current detected by the first current detector with the current detected by the second current detector, and which detects respective wiring conditions of the first current detector and the second current detector.

12. The power supply switching device according to claim 1,
wherein, when the controller determines that the voltage detected by the first voltage detector indicates that the power system has recovered from the blackout, the controller actuates the first parallel-off unit to interconnect the power storage and the load with the power system in direct response to an instruction given by a user.

13. The power supply switching device according to claim 1,
wherein, when the controller determines that the voltage detected by the first voltage detector indicates that the power system has recovered from the blackout, the controller actuates the first parallel-off unit to interconnect the power storage and the load with the power system in direct response to a user turning on a shutoff breaker.

14. A monitoring device comprising:
a first voltage acquirer that acquire, from a first voltage detector which is disposed at a primary side of a first parallel-off unit that parallels off a power storage and a load from a power system and which detects a voltage of the power system, the voltage of the power system; and
a controller configured to determine whether the voltage acquired by the first voltage acquirer indicates that the power system has recovered from a blackout when the first parallel-off unit is performing parallel-off from the power system on the power storage and the load;
wherein, when the controller determines that the voltage acquired by the first voltage acquirer indicates that the power system has recovered from the blackout, the controller actuates the first parallel-off unit to interconnect the power storage and the load with the power system based on an instruction given by a user.

15. A power supply switching method comprising:
a first voltage acquisition step of acquiring, from a first voltage detector which is disposed at a primary side of a first parallel-off unit that parallels off a power storage and a load from a power system and which detects a voltage of the power system, the voltage of the power system;
a control step of determining whether the voltage acquired in the first voltage acquisition step indicates that the power system has recovered from a blackout when the first parallel-off unit is performing parallel-off from the power system on the power storage and the load; and a control step of actuating the first parallel-off unit to interconnect the power storage and the load with the power system based on an instruction given by a user when the controller determines that the voltage acquired in the first voltage acquisition step indicates that the power system has recovered from the blackout.

16. A non-transitory computer-readable recording medium recording a program for causing a computer to execute:

a first voltage acquisition step of acquiring, from a first voltage detector which is disposed at a primary side of a first parallel-off unit that parallels off a power storage and a load from a power system and which detects a voltage of the power system, the voltage of the power system;

a control step of determining whether the voltage acquired in the first voltage acquisition step indicates that the power system has recovered from a blackout when the first parallel-off unit is performing parallel-off from the power system on the power storage and the load; and a control step of actuating the first parallel-off unit to interconnect the power storage and the load with the power system based on an instruction given by a user when the controller determines that the voltage acquired in the first voltage acquisition step indicates that the power system has recovered from the blackout.

* * * * *